US009871713B2

(12) United States Patent
Forsberg

(10) Patent No.: US 9,871,713 B2
(45) Date of Patent: Jan. 16, 2018

(54) SESSION BASED NETTRACE AND TEST CALL
(75) Inventor: Mikael Forsberg, Tyreso (SE)
(73) Assignee: Telefonaktiebolaget LM Ericsson (Publ), Stockholm (SE)
( * ) Notice: Subject to any disclaimer, the term of this patent is extended or adjusted under 35 U.S.C. 154(b) by 353 days.
(21) Appl. No.: 14/397,853
(22) PCT Filed: May 15, 2012
(86) PCT No.: PCT/EP2012/059058
§ 371 (c)(1),
(2), (4) Date: Oct. 29, 2014
(87) PCT Pub. No.: WO2013/170889
PCT Pub. Date: Nov. 21, 2013

(65) Prior Publication Data
US 2015/0142957 A1 May 21, 2015

(51) Int. Cl.
G06F 15/173 (2006.01)
H04L 12/26 (2006.01)
H04L 29/06 (2006.01)
(52) U.S. Cl.
CPC .......... H04L 43/10 (2013.01); H04L 65/1006 (2013.01); H04L 65/1016 (2013.01); H04L 65/1069 (2013.01); H04L 65/80 (2013.01)
(58) Field of Classification Search
CPC ............. H04L 65/1006; H04L 65/1069; H04L 65/1016; H04L 65/105; H04L 65/1096;
(Continued)

(56) References Cited

U.S. PATENT DOCUMENTS

2004/0121775 A1* 6/2004 Ropolyi ................ H04L 63/00 455/445
2007/0259651 A1* 11/2007 Bae .................. H04L 29/06027 455/412.1
(Continued)

FOREIGN PATENT DOCUMENTS

EP 2288103 A1 2/2011

OTHER PUBLICATIONS

PCT Notification of Transmittal of the International Search Report and the Written Opinion of the International Searching Authority, or the Declaration for Counterpart International Application No. PCT/EP2012/059058, dated Apr. 3, 2013, 11 pages.
3GPP TS 32.421 V11.1.0, "Telecommunication management; Subscriber and equipment trace; Trace concepts and requirements," *3rd Generation Partnership Project, Technical Specification Group Services and System Aspects*, (Release 11), (Dec. 2011) 37 pages.
3GPP TS 32.422 V11.2.0, "Telecommunication management; Subscriber and equipment trace; Trace control and configuration management," *3rd Generation Partnership Project, Technical Specification Group Services and System Aspects*, (Release 11), (Dec. 2011) 120 pages.
(Continued)

*Primary Examiner* — Lan-Dai T Truong
(74) *Attorney, Agent, or Firm* — Patent Portfolio Builders, PLLC

(57) ABSTRACT

Methods and apparatus are provided for performing a trace session between a first user equipment (UE), and a second UE in a telecommunications network including an IMS network. A trace session initiator activates the trace session with an activation request message, or a Session Initiation Protocol (SIP) INVITE message, including trace settings comprising informational elements describing the trace session. The activation message may be converted into the SIP INVITE message and sent towards the first and/or the second UE. The SIP INVITE message may include trace settings as extensible mark-up language (XML) informational elements within the body of the SIP INVITE request message and/or as request Uniform Resource Identifier informational elements within the SIP INVITE request message. Network elements in the communications path between the UEs are configured to detect the trace session by (Continued)

detecting the trace settings in the SIP INVITE request message and act accordingly.

32 Claims, 17 Drawing Sheets

(58) Field of Classification Search
CPC ............... H04L 65/104; H04L 65/1063; H04L 29/06224; H04L 29/06027
USPC .................................. 709/224, 220, 227, 230
See application file for complete search history.

(56) References Cited

U.S. PATENT DOCUMENTS

2008/0144615 A1* 6/2008 Casey .................. H04L 29/125
 370/389

2013/0086653 A1* 4/2013 Gupta ................... H04W 4/005
 726/5

OTHER PUBLICATIONS

3GPP TS 32.422 V11.3.0, "Telecommunication management; Subscriber and equipment trace; Trace control and configuration management," *3rd Generation Partnership Proiect, Technical Specification Group Services and System Aspects*, (Release 11), (Mar. 2012) 121 pages.

3GPP TS 32.423 V11.0.0, "Telecommunication management; Subscriber and equipment trace; Trace data definition and management," *3rd Generation Partnership Project, Technical Specification Group Services and System Aspects*, (Release 11), (Dec. 2011) 78 pages.

International Preliminary Report on Patentability for Counterpart International Application No. PCT/EP2012/059058, dated Nov. 18, 2014, 5 pages.

* cited by examiner

SESSION BASED NETTRACE AND TEST CALL

CROSS-REFERENCE TO RELATED APPLICATIONS

This application is a National stage of International Application No. PCT/EP2012/059058, filed May 15, 2012, which is hereby incorporated by reference.

TECHNICAL FIELD

The present invention relates to methods and apparatus for use in performing a trace session in a network. In particular, the invention relates to methods and apparatus for performing the trace session associated with a first and second user equipment via SIP messaging to optimise the performance of the trace session.

BACKGROUND

IP Multimedia services provide a dynamic combination of voice, video, messaging, data, etc. within the same session. By growing the number of basic applications and the media which it is possible to combine, the number of services offered to the end subscribers will grow, and the inter-personal communication experience will be enriched. This will lead to a new generation of personalised, rich multimedia communication services, including so-called "combinational IP Multimedia" services.

IP Multimedia Subsystem (IMS) is the technology defined by the Third Generation Partnership Project (3GPP) and ETSI TISPAN group to provide IP Multimedia services over mobile communication networks. IMS provides key features to enrich the end-subscriber person-to-person communication experience through the use of standardised IMS Service Enablers, which facilitate new rich person-to-person (client-to-client) communication services as well as person-to-content (client-to-server) services over IP-based networks. The IMS makes use of the Session Initiation Protocol (SIP) to set up and control calls or sessions between subscriber terminals (or subscriber terminals and application servers). The Session Description Protocol (SDP), carried by SIP signalling, is used to describe and negotiate the media components of the session. Whilst SIP was created as a subscriber-to-subscriber protocol, IMS allows operators and service providers to control subscriber access to services and to charge subscribers accordingly.

By way of example, FIG. 1 illustrates schematically how the IMS fits into the mobile network architecture in the case of a GPRS/PS access network (IMS can of course operate over other access networks). Call/Session Control Functions (CSCFs) operate as SIP proxies within the IMS. The 3GPP architecture defines three types of CSCFs: the Proxy CSCF (P-CSCF) which is the first point of contact within the IMS for a SIP terminal; the Serving CSCF (S-CSCF) which provides services to the subscriber that the subscriber is subscribed to; and the Interrogating CSCF (I-CSCF) whose role is to identify the correct S-CSCF and to forward to that S-CSCF a request received from a SIP terminal via a P-CSCF.

Within the IMS service network, Application Servers (ASs) are provided for implementing IMS service functionality. ASs provide services to end users in an IMS system, and may be connected either as end-points over the 3GPP defined Mr interface, or "linked in" by an S-CSCF over the 3GPP defined ISC interface. In the latter case, Initial Filter Criteria (IFC) are used by an S-CSCF to determine which Ass should be "linked in" during a SIP Session establishment (or indeed for the purpose of any SIP method, session or non-session related). The IFCs are received by the S-CSCF from a home subscriber server (HSS) during the IMS registration procedure as part of a user's or subscriber's Subscriber Profile.

A user equipment may comprise or represent any device used for communications. Examples of UE that may be used in certain embodiments of the described network(s) are wireless devices such as mobile phones, terminals, smart phones, portable computing devices such as lap tops, hand-held devices, tablets, net books, computers, personal digital assistants and other wireless communication devices, or wired communication devices such as telephones, computing devices such as desktop computers, set-top boxes, and other fixed communication devices.

A network element may comprise or represent any network node, device, function, or entity in a telecommunications network for use in allowing a UE access to the network. Examples of network elements that may be used in certain embodiments of the described network(s) are network elements, nodes, devices, functions, or entities that make up core network(s), access network(s) such as packet or circuit switched network(s), IP based networks, 2G, 3G, 4G and next generation networks, IMS core network, IMS service network, and service and external networks and the like. Other examples include the network elements such as those illustrated in FIG. 1.

A trace session is a communications session in which a test call is made to determine where a network problem may exist within a telecommunications network. For example, a customer support helpdesk or a field technician may use a UE, e.g. UE A, to initiate a trace session with the UE of a user or subscriber, e.g. UE-B, in which the network trace is configured to trigger selected network elements and the associated UEs to send trace results to a trace collection entity for analysis. There are several types of activation methods available for performing network troubleshooting such as management activated or signalling activated trace sessions. There are also several types of trace sessions such as Net Trace and SIP trace sessions.

The 3GPP Technical Standards 32.421, 32.422, and 32.423 provide guidance for current trace sessions for use in tracing problems within a telecommunications network including an IMS network. In particular, TS 32.421 describes subscriber and equipment trace concepts and requirements, TS 32.422 describes subscriber and equipment trace control and configuration management, and TS 32.423 describes subscriber and equipment trace data definition and management. The current procedures include initiating a trace session via management activation or signalling activation, which is described in TS 32.422.

A management activation trace session requires interaction with all selected network or node elements, in which each network element requires memory to store the trace results for the duration of the trace session. The trace results include data representative of traffic data from the call established during the trace session. In addition, this type of activation method is non-standardised, and may require different procedures for operating network elements from different vendors.

A signalling activation trace session activates a trace per subscriber in the HSS. The trace session may only be activated when a UE re-registers with the network. Propagation to each network element is performed at re-registration resulting in a slow procedure for retrieving trace results.

This type of activation method requires additional central processing power in the HSS and within the network elements and requires additional memory for storing the trace results during the trace session.

As described above, management activation network trace procedures require interaction with each network element or node in the network. Signalling activation network trace activation is done well in time before a test call is made. Signalling activation also requires that the AS uses third party re-registrations and typically queries the HSS for each re-register to determine if the network trace status has changed since the last re-registration. These re-registrations to the AS and the need for Sh lookup in the HSS require a large amount of central processing power. In addition, is it not possible to know when, for example, the AS will have the new network trace status because of the long time (e.g. hours) between each re-registration.

There is a desire to have the ability to place test calls in the telecommunications network to determine whether and where a network problem may exist, even all the way to the UE without actually making the UE ring. There is also a desire as a customer support helpdesk or field technician to activate network trace dynamically to get instant trace results in the telecommunications network. There is also a desire for a customer support helpdesk or field technician to perform trace calls without disturbing the end user, while getting network information from all nodes and the terminating UE.

SUMMARY

In order to address or solve the problems identified above, it is proposed to introduce a dynamic method for activating a trace session and for minimising the storage of network trace results. The method includes triggering a trace session associated with a first and a second user equipment such that trace settings are included within the SIP INVITE request messages used to set-up a call between the first and second UEs. When the SIP INVITE request messages are sent toward one or the other UE or both, the network elements in the communication path of the UEs detect the trace settings within the SIP INVITE message and provide response messages in relation to the trace session to an AS or other network element or entity and/or response messages in the form of network trace result data to a trace collection entity.

According to a first aspect of the invention there is provided a method for operating an AS of an IMS network during a trace session performed in a telecommunications network including the IMS network, a first user equipment, UE, and a second UE. The trace session is associated with the first and second UEs. The method includes receiving, from a trace session initiator, an activation request message for activating the trace session. The activation request message includes trace settings comprising informational elements describing the trace session and identity information associated with the second UE. Determining from the trace settings one or more network elements for use in forwarding a SIP INVITE request message towards the second UE and transmitting the SIP INVITE request message including the trace settings towards the second UE. Receiving, in response to the SIP INVITE request message, a SIP response message associated with, or from, the second UE for use in terminating the trace session.

As an option, the method includes inserting the trace settings as extensible mark-up language, XML, informational elements within the body of the SIP INVITE request message. Alternatively or additionally, inserting the trace settings as request Uniform Resource Identifier informational elements within the SIP INVITE request message. Optionally, the method may include transmitting a call termination message towards the first UE on receiving the SIP response message from the second UE. As an option, when the trace initiator is the first UE, the call termination message is the SIP response message from the second UE.

Optionally, when the application server is configured to control the trace session, the step of terminating the trace session includes transmitting a call termination message towards the first UE on receiving the SIP response message from the second UE, and transmitting a trace termination message, to the trace session initiator, for terminating the trace session on receiving an acknowledgement response from the first UE.

Additionally, the telecommunications network may further include a first network element in the communication path between the AS and the first UE and a second network element in the communication path between the AS and the second UE, and the activation request message includes identities of the first and second UEs for use by the AS in transmitting SIP INVITE request messages towards the first and second UEs. The step of transmitting the SIP INVITE request message further includes transmitting a first SIP INVITE request message associated with the first UE towards the first network element, and transmitting a second SIP INVITE request message associated with the second UE towards the second network element, the SIP INVITE request messages including the trace settings and for use in setting up a trace call between the first and second UEs.

As an option, the trace session initiator includes an element manager or other network entity, where the first UE is associated with the element manager or other network entity and the second UE is associated with a user. The activation request message includes trace settings and identity information associated with the first and second UE.

Optionally, the trace session initiator is the first UE and the activation request message is a SIP INVITE message associated with the second UE and including trace settings associated with the trace session and the step of terminating the trace session includes transmitting the SIP response message associated with, or from, the second UE towards the first UE for terminating the trace session.

Optionally, when the trace session includes a network trace session (or Net Trace session), the trace setting informational elements include informational elements describing the Net Trace session and the telecommunications network further includes a trace collection entity. Additionally, the method may further comprise transmitting at least one trace response message to the trace collection entity in response to receiving at least one of the messages from the group comprising: the activation request message from the trace session initiator; at least one response message associated with, or from, the first UE; at least one response message associated with, or from, the second UE; in which the at least one trace response message comprises Net Trace result information based on at least one of the received messages from the group, the Net Trace result information in the form of XML informational elements.

Alternatively or additionally, when the trace session includes a SIP trace session, the trace setting informational elements may further include SIP informational elements describing the SIP trace session, where the SIP informational elements may include an indication for at least one of the UEs to respond to the trace request message without disturbing the user of the at least one user equipment. As an option, the indication may include at least one of a predefined SIP message from the group of: a reject reason or response code; a reason phrase; and a warning header; where the indication is used by the UE in response to receipt of an INVITE request message.

According to a second aspect of the invention, there is provided a method for operating a network element of a telecommunications network during a trace session, the telecommunications network comprising an IMS network and a first and second user UE. The trace session is associated with the first and second UEs. The method may include receiving a SIP INVITE request message associated with the first or the second UE. The SIP INVITE request message including trace settings describing the trace session. Detecting the trace settings within the INVITE request message and forwarding the received INVITE request message towards the first or the second UE, respectively, based on the trace settings. As an option, the method may include transmitting, in response to receiving the SIP INVITE request message and detecting the trace settings, response messages associated with the trace session.

As an option, the trace settings may be detected as extensible mark-up language, XML, informational elements within the body of at least one of the SIP INVITE request messages. Alternatively or additionally, the trace settings may be detected as request uniform resource identifier informational elements within at least one of the SIP INVITE request messages.

Optionally, when the trace session includes a Net Trace session, the trace setting informational elements may include informational elements describing the Net Trace session and the telecommunications network may further include a trace collection entity. The method may further include transmitting at least one of the response messages in the form of a trace response message to the trace collection entity in response to receiving at least one of the messages from the group comprising: an SIP INVITE request message associated with the first or the second UE; at least one response message associated with the first UE or the second UE; at least one call termination message associated with the second UE; and an activation request message associated with a trace session initiator; where the at least one trace response message comprises Net Trace result information (or network trace result data) based on at least one of the received messages from the group, the Net Trace result information in the form of XML informational elements.

According to a third aspect of the invention there is provided a method for operating a UE during a trace session in a telecommunications network comprising an IMS network. The method comprising receiving a SIP INVITE request message, the SIP INVITE request message including trace settings comprising informational elements describing the trace session. Detecting the trace settings comprising the informational elements, and responding to the SIP INVITE request message based on the trace settings. As an option, responding may include sending a SIP response message towards one or more network elements and/or a response message to a trace collection entity in response to the SIP INVITE request message based on the trace settings.

As an option, the method further comprises detecting the trace settings as extensible mark-up language, XML, informational elements within the body of the SIP INVITE request message, and/or, request Uniform Resource Identifier informational elements within the SIP INVITE request message. Additionally, the method may include transmitting, based on the received Net Trace settings, a call termination response message including data representative of call rejection towards a user equipment, or a network element or an AS controlling the trace session, on receiving the SIP INVITE request message.

Optionally, when the trace session includes a Net Trace session, the trace setting informational elements include informational elements describing the Net Trace session and the telecommunications network further includes the trace collection entity. The method may further include transmitting at least one trace response message to the trace collection entity in response to receiving the SIP INVITE request message, wherein the trace response message comprises Net Trace result information based the SIP INVITE request message and the trace settings, the Net Trace result information in the form of XML informational elements.

As an option, when the trace session includes a session initiation protocol, SIP, trace session, the trace setting informational elements may include SIP informational elements describing the SIP trace session, where the SIP informational elements include an indication requiring the UE to respond to the INVITE request message without disturbing the user.

Optionally, the UE may be a trace session initiator, and the method may further include generating a trace activation request message including trace settings associated with the user equipment and the second UE and transmitting the trace activation request message towards the second user equipment. As an option, the method may include receiving a SIP response message from the second UE based on the trace settings and terminating the trace session. Alternatively or in addition, the trace settings may be included into the activation request message as XML informational elements within the body of the activation request message, and/or as R-URI informational elements within the activation request message. As an option, the activation request message may be a SIP INVITE request message associated with the second UE.

According to a fourth aspect of the invention there is provided an AS of an IMS network for use in a trace session performed in a telecommunications network. The telecommunications network comprising the IMS network, a first user equipment, UE, and a second UE. The trace session is associated with the first and second UEs. The AS comprising a receiver, a transmitter, a memory unit, and a processor. The processor being connected to the receiver, to the transmitter, and to the memory unit. The receiver is configured for receiving, from a trace session initiator, an activation request message for activating the trace session, the activation request message including trace settings comprising informational elements describing the trace session and identity information associated with the second UE. The processor is configured for determining from the trace settings one or more network elements for use in forwarding a SIP INVITE request message towards the second UE. The transmitter is configured for transmitting the SIP INVITE request message including the trace settings towards the second UE. The receiver and processor are further configured for receiving, in response to the SIP INVITE request messages, a SIP response message associated with, or from, the second UE.

As an option, the transmitter may be is further configured for transmitting a deactivation response message, to the trace session initiator, for deactivating the trace session based on receiving the SIP response message from the second UE.

As an option, the processor is further configured to insert the trace settings as extensible mark-up language, XML, informational elements within the body of the SIP INVITE request message, and/or, insert the trace settings as request Uniform Resource Identifier informational elements within the SIP INVITE request message.

Optionally, the processor may configure the application server to control the trace session, where the transmitter and processor are further configured for terminating the trace session by transmitting a call termination message towards the first UE on receiving the SIP response message from the second UE, and transmitting a trace termination message, to the trace session initiator, for terminating the trace session on receiving an acknowledgement response from the first UE.

Optionally, when the trace session includes a Net Trace session, the trace setting informational elements include informational elements describing the Net Trace session and the telecommunications network further includes a trace collection entity. The processor and transmitter are further configured to generate and transmit at least one trace response message to the trace collection entity in response to receiving at least one of the messages from the group comprising: the activation request message from the trace session initiator; at least one response message associated with, or from, the first UE; at least one response message associated with, or from, the second UE, where the at least one trace response message comprises Net Trace result information based on at least one of the received messages from the group, the Net Trace result information in the form of XML informational elements.

As an option, when the trace session includes a SIP trace session, the trace setting informational elements further include SIP informational elements describing the SIP trace session, wherein the SIP informational elements include an indication for at least one user equipment to respond to the trace request message without disturbing the user of the at least one user equipment.

According to a fifth aspect of the invention there is provided a network element of a telecommunications network, the telecommunications network comprising an IMS network and a first and second UE, where the trace session is associated with the first and second UEs. The network element comprising a receiver, a transmitter, a memory unit, and a processor. The processor being connected to the receiver, to the transmitter, and to the memory unit. The receiver is configured for receiving a SIP INVITE request message associated with the first or the second UE, the SIP INVITE request message including trace settings describing the trace session. The processor is configured for detecting the trace settings within the INVITE request message. The transmitter is configured for forwarding the received INVITE request message towards the first or the second UE, respectively, based on the trace settings.

As an option, the processor is further configured to detect the trace settings from at least any one of extensible mark-up language, XML, informational elements within the body of the INVITE request message, and/or, request Uniform Resource Identifier informational elements within the INVITE request message.

As an option, the processor and transmitter are further configured for transmitting, in response to receiving the SIP INVITE request message and detecting the trace settings, response messages associated with the trace session towards the sender of the SIP INVITE request message and/or a trace collection entity.

According to a sixth aspect of the invention, there is provided a UE for use in a trace session performed in a telecommunications network, the telecommunications network comprising an IMS network. The trace session is associated with the UE. The UE comprising a receiver, a transmitter, a memory unit, and a processor. The processor being connected to the receiver, to the transmitter, and to the memory unit. The receiver is configured for receiving a SIP INVITE request message, the INVITE request message including trace settings comprising informational elements describing the trace session. The processor is configured for detecting the trace settings comprising the informational elements. The processor and transmitter are configured for responding to the SIP INVITE request message based on the trace settings.

As an option, the processor is further configured to detect the trace settings based from at least any one of extensible mark-up language, XML, informational elements within the body of the trace request message, and/or, request uniform resource identifier informational elements within the trace request message.

As an option, the processor and transmitter are configured for responding by sending a response message towards a network element, an application server, and/or a trace collection entity in response to the SIP INVITE request message based on the trace settings.

Optionally, when the trace session includes a Net Trace session, the trace setting informational elements include informational elements describing the Net Trace session and the telecommunications network further includes the trace collection entity, the processor and transmitter are further configured to generate and transmit at least one trace response message to the trace collection entity in response to receiving the SIP INVITE request message, wherein the trace response message comprises Net Trace result information, wherein the processor is further configured to insert the Net Trace result information into the body of the trace response message in the form of XML informational elements.

As an option, when the trace session includes a SIP trace session, the trace setting informational elements may further include SIP informational elements describing the SIP trace session, wherein the processor is further configured to detect the SIP informational elements including an indication for the UE to respond to the trace request message without disturbing the user.

Additionally or alternatively, the processor is further configured to generate a trace activation request message including trace settings associated with the UE and a second UE, and the transmitter is further configured to transmit the trace activation request message towards the second UE for performing the trace session. As an option, the activation request message comprises a SIP INVITE request message associated with the second UE, the SIP INVITE request message including the trace settings associated with the trace session. As an option, the processor is further configured to generate the trace activation request message including trace settings associated with the user equipment and a second user equipment, where the trace settings are inserted into the activation request message as XML informational elements within the body of the SIP INVITE request message, and/or R-URI informational elements within the SIP INVITE request message. In addition, the transmitter is further configured to transmit the trace activation request message towards the second user equipment. As an option, the receiver is further configured to receive a SIP response message from the second UE based on the trace settings and terminating the trace session.

Embodiments of the present invention can provide a relatively simple and efficient mechanism for allowing an operator or support person to perform a network trace in a telecommunications network including an IMS network. The above methods, apparatus and mechanisms can be used for efficiently performing a trace session in which an AS in the IMS network is triggered to perform a trace session using SIP INVITE request messages with trace settings included. However, the current trace sessions as defined in 3GPP TS 24.421, 24.422, and 24.423 (or any other trace session for that matter) do not specify this possibility for activating a trace session or for sending trace results data in response to reception of response messages to the SIP INVITE request messages.

This allows a support person, e.g. customer care call centre or a field engineer, to make test calls that generate a network trace as defined in the above-mentioned standards, but without the interaction with any of the network elements in the telecommunications network or the receiving UE. As there is no interaction with the network elements, there is no need for any knowledge about the network topology, including IP-addresses, and other configuration parameters. The option to have any network element, or the terminating UE automatically answer the call makes it possible to have an immediate feed back of how the telecommunications network is working without disturbing the end user of the terminating UE e.g. suppression of the ringing of their UE due to a test call from customer care is possible.

The advantages of the present invention provide removal of network configuration as all the required information is included in the signaling itself, possibility to perform instant test calls with network trace (e.g. Net Trace) turned on without explicit interaction with all involved network elements or the current necessary waiting period. Further advantages of the present invention provide reduced load in the telecommunications network as well as in the network elements as the extra trace related messages are not needed, and the possibility to make test calls all the way to terminating UEs, or receiving UEs (e.g. the end users UE) without disturbing the user by making real calls.

BRIEF DESCRIPTION OF THE DRAWINGS

In order that the invention may be more fully understood, some of the embodiments of the invention will now be described, by way of example only, with reference to the accompanying drawings, in which.

DETAILED DESCRIPTION

Figure 1:
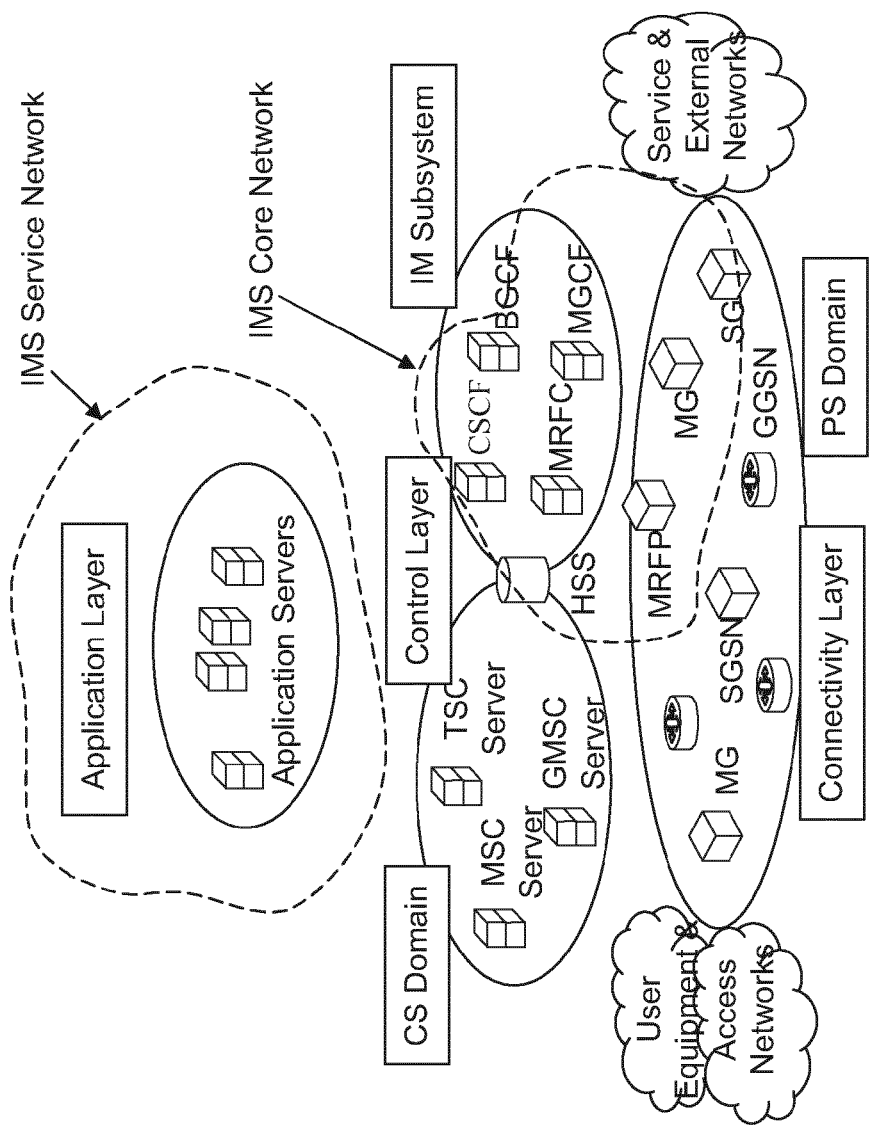
FIG. 1 illustrates schematically a telecommunications network including an IMS network, a 3G mobile communications system, access networks and user equipment.

As has already been described, an apparatus (e.g. a UE, AS or other network entity) is provided to allow a trace session initiator for example, a support person, a customer care call centre, an element manager, a field engineer or any other device or network element to make test calls that generate a network trace session (Net Trace) as defined in TS 24.421, 24.422, and 24.423, but without interaction with any of the network elements in the telecommunications network or the receiving/terminating UE. This provides the advantages that there is no requirement for knowledge about the network topology, including IP-addresses, and other configuration parameters.

The option to have any network element or the receiving/terminating UE to automatically answer the test call (including without disturbing the user) makes it possible to have an immediate feed back of how the telecommunications network is performing.

In order to address the problems identified above, it is proposed to introduce a mechanism for allowing network elements and UEs to quickly detect the activation of a trace session and to respond accordingly. This is implemented by introducing into SIP INVITE request messages XML bodies or R-URI parameters (or informational elements) that define the parameters for Net Trace response and/or SIP Trace response by a network element or UE during a Net Trace and/or SIP Trace—based trace session.

The XML body or R-URI parameters may include the trace settings of the trace session within a SIP INVITE request message, which is sent towards the UEs associated with the trace session. The network elements and UEs are configured to detect the trace settings in the XML body and/or the R-URI parameters and act to accordingly during the trace session. In particular, trace settings such as the Net Trace and SIP settings may be included as an XML body or R-URI parameters within the INVITE request messages sent to the corresponding UEs.

Net Trace settings may include the standard Net Trace depths (0 to 5) that have been defined in the 3GPP standards, e.g. TS 24.422. These are defined as:
  0—Minimum,
  1—Medium,
  2—Maximum,
  3—MinimumWithoutVendorSpecificExtension,
  4—MediumWithoutVendorSpecificExtension,
  5—MaximumWithoutVendorSpecificExtension.

An example of the XML body that includes XML informational elements describing the Net Trace settings for a Net Trace session may take the form:

```
<?xml version="1.0"?>
<ims-nettrace xmlns="urn:3gpp:ns:nettrace:1.0">
    <nettrace active="true">
        <public-user-identity>PUI</public-user-identity>
        <service-identification>SI</service-identification>
        <trace-reference>TR</trace-reference>
        <service-level-tracing-counter>SLTC</service-level-
        tracing-counter>
        <trace-depth>0</trace-depth>
        <trace-type>hr</trace-type>
        <net-trace-collector>NTC</net-trace-collector>
    </nettrace>
</ims-nettrace>
```

These settings are used by the network elements and UEs to send the Net Trace result data as specified in the corresponding 3GPP standards. The Net Trace result data may include traffic data from establishing a call between the UEs.

As an example, the <trace-type> informational element can take two values e.g. hr for human readable and mr for machine readable. The hr format includes headers in clear text whereas the mr format is encoded. The <net-trace-collector> informational element defines the address of the trace collection entity (e.g. Net Trace Collector address) to where the Net Trace result data (or network trace result data) shall be sent. This XML informational element is optional, and if present, it will override any Net Trace Collector address defined locally in the network element or UE.

Alternatively or additionally, the trace settings may be carried in the R-URI of the INVITE request message as Net Trace URI parameters or informational elements. The same information as defined in the above XML body for Net Trace may be defined as R-URI informational elements and may take the form:
  INVITE sip:+46107190000; nettrace-active=true; public-user-identity=PUI; service-identification=SI; trace-reference=TR; service-level-tracing-counter=SLTC; trace-depth=0; @domain.com SIP/2.0

An example of the XML body that includes XML informational elements describing the SIP Trace settings for a SIP Trace session may take the form:

```
<?xml version="1.0"?>
<ims-siptrace xmlns="urn:3gpp:ns:siptrace:1.0">
    <responder>NE or UE that shall respond</responder>
    <response-code>SIP Response Code</respone-code>
    <reason-phrase>SIP reason phrase</reason-phrase>
    <warning-header>Warning text</warning-header>
</ims-siptrace>
```

The <responder> informational element defines the network elements and/or UEs that should respond (e.g. answer) to the incoming SIP INVITE request message. The network element or UE that responds may include in their response the informational elements <response-code> and <reason-phrase>, and in addition a 399 Warning header may be added including the text defined in the informational element <warning-header>.

The <responder> informational element may be based on a list in the following format {[orig|term]_<node type>}, where orig_<node type> indicates a node on the originating side of the test call and term_<node type> indicates a node on the terminating side of the test call. For example, a responder list may take the form: orig_AS, term_SCC_AS, term_MMTel_AS, orig_S-CSCF, term_SBG.

Alternatively or additionally, the trace settings may be carried in the R-URI parameters of the INVITE request message as SIP Trace URI parameters or informational elements. The same information as defined in the above XML body for SIP Trace may be defined as R-URI informational elements and may take the form:

INVITE sip:+46107190000; sip-trace=active; responder=term_UE; response-code=Response code; reason-phrase=Reason Phrase; warning-header=Warning Header; @domain.com SIP/2.0.

XML bodies or R-URI parameters based on the above examples may be used to include the trace settings of the trace session within SIP INVITE request messages that are sent towards the UEs associated with the trace session. The network elements and UEs are configured to detect the trace settings in the XML body and/or the R-URI parameters and act to accordingly during the trace session.

Methods and apparatus are provided for performing a trace session between a first UE and a second UE in a telecommunications network including an IMS network. A trace session initiator activates the trace session with an activation request message, which may be a SIP INVITE message, including trace settings comprising informational elements describing the trace session. The activation message may also be converted into SIP INVITE message(s) and sent towards the first and/or the second UEs. The SIP INVITE message sent towards a UE may include trace settings as XML informational elements within the body of the SIP INVITE request message and/or as R-URI informational elements within the SIP INVITE request message. Network elements in the communications path between the UEs are configured to detect the trace session by detecting the trace settings within the SIP INVITE request message and act accordingly. This provides the advantages of reduced network load in the network and network elements and removal of network configuration as all the required information is included in the signaling. Further examples of the invention are now provided.

Figure 2A:
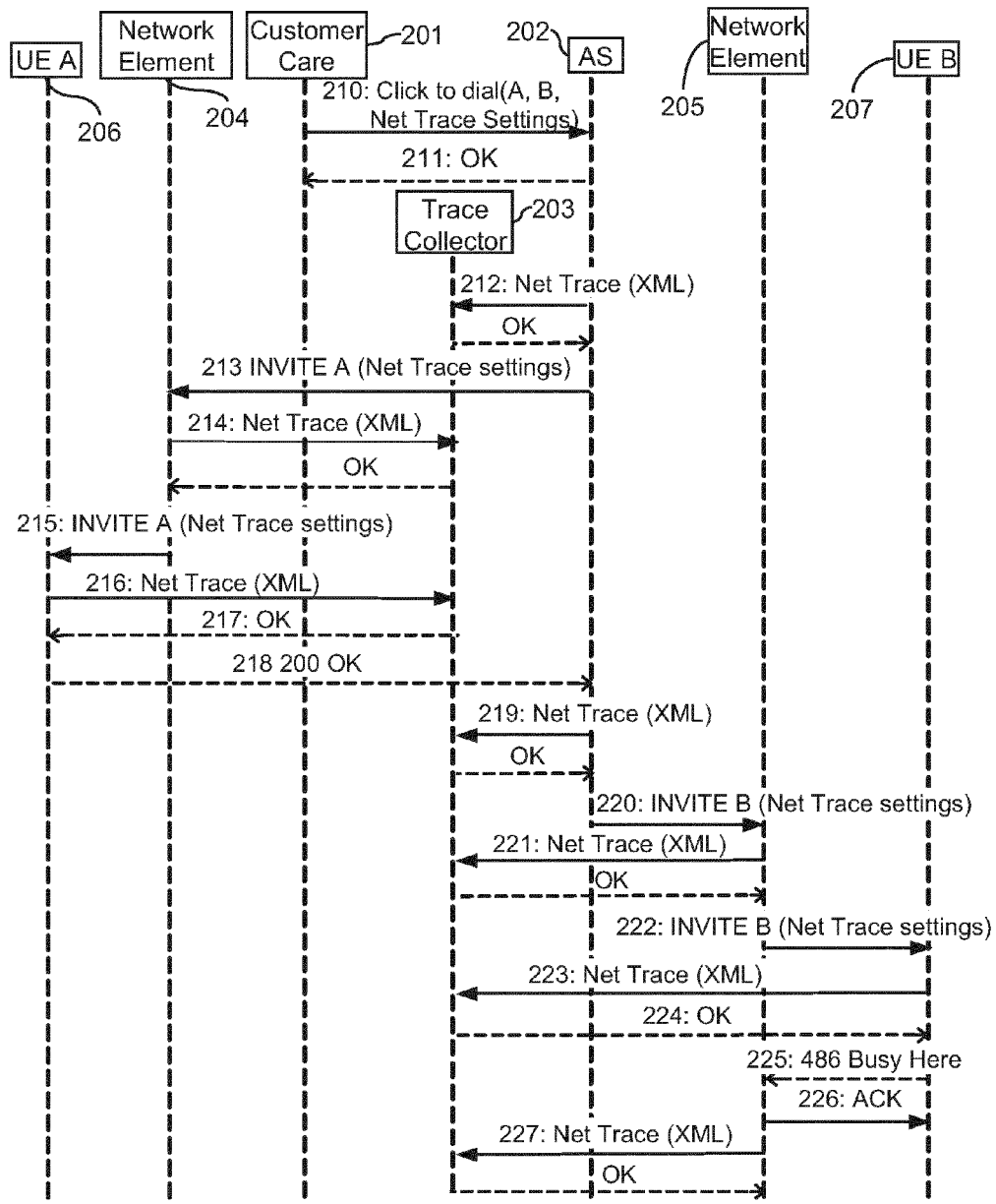
FIG. 2a is a signalling flow diagram illustrating an example of a first part of a Net Trace session according to the invention.
Figure 2B:
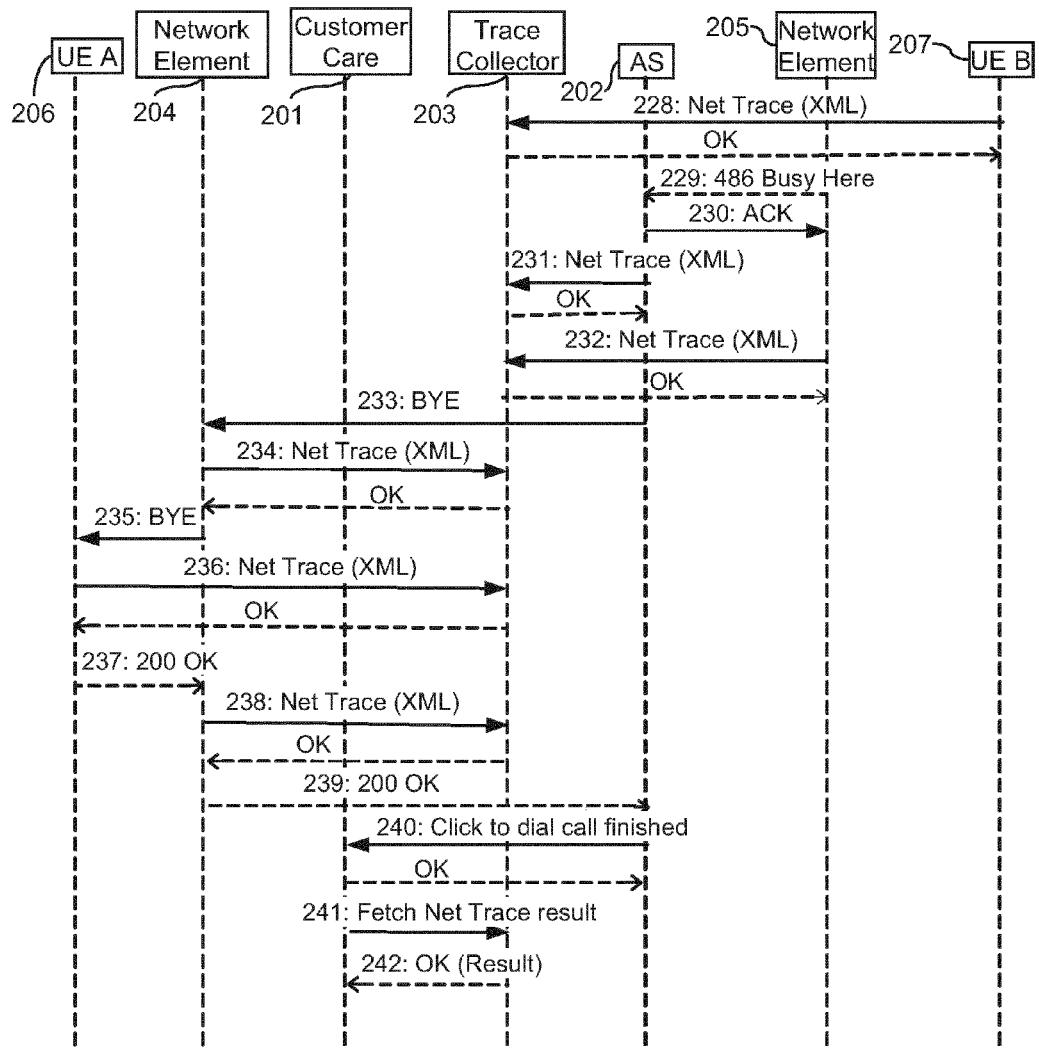
FIG. 2b is a signalling flow diagram illustrating an example of a second part of a Net Trace session according to the invention.

FIGS. 2a and 2b are signalling flow diagrams illustrating an example process 200 of a trace session according to the invention. In this example, the trace session is a Net Trace based trace session in which the telecommunications network includes trace session initiator comprising a customer care unit 201 that may include an element manager, an AS 202, a trace collector entity 203, a first and second network element 204 and 205, and a first UE (e.g. UE-A) and a second UE (e.g. UE-B) 206 and 207. For simplicity, this example only includes a first and a second network element 204 and 205, however, it is to be appreciated that a plurality of network elements may be located within the communications path between the AS 202 and the first and/or second UEs 206 and 207 and these will operate similarly as for the first and second network elements 204 and 205.

In step 210, the customer care unit 201 is configured to trigger a trace session by sending an activation request message (e.g. Click_to_Dial(A, B, Net Trace settings)) including trace settings such as Net Trace settings to AS 202. The activation request message includes the identities of the first UE 206 (UE A) and the second UE 207 (UE B). For example, various user identities may include, but is not limited to, URIs, SIP URIs, IP Multimedia Private Identity (IMPI), IP Multimedia Public Identity (IMPU), Globally Routable User Agent URI (GRUU), Wildcarded Public User Identity or any other identifier for use in sending messages to the first and second UEs 206 and 207. In step 211, AS 202 responds with an acknowledgement message (e.g. OK) indicating to the customer care unit 201 that the corresponding trace session has been activated.

On receipt of the activation request message at the AS 202 a SIP INVITE request message(s) is triggered for a call between the first and the second UEs 206 and 207. In step 212, the AS 202 transmits, in response to receiving the activation request message and sending the acknowledgement, to the trace collection entity 203 data representative of network trace result data (e.g. Net Trace(XML)) associated with an INVITE request message that the AS 202 will be transmitting to the first UE 206. In this example, the network trace result data is sent using the XML format. In step 213, on receipt of an acknowledgement message (e.g. OK) from the trace collection entity 203, the AS 202 transmits a SIP INVITE request message towards the first UE 206 (e.g. INVITE A(Net Trace Settings)), where the INVITE request message is configured to include trace settings including the Net Trace Settings. These may be included in the INVITE request message as either XML Informational elements and/or as R-URI informational elements.

In step 214, the first network element 204 transmits, in response to receiving the INVITE request message associated with the first UE and on detecting the Net Trace settings, to the trace collection entity 203 data representative of a network trace result data (e.g. Net Trace(XML)) associated with the INVITE request message that the first network element 204 will be transmitting towards the first UE 206. In step 215, on receipt of an acknowledgement message (e.g. OK) from the trace collection entity 203, the first network element 204 transmits the SIP INVITE request message towards the first UE 206 (e.g. INVITE A(Net Trace Settings)), the INVITE request message including the Net Trace Settings.

In step 216, the first UE 206 transmits, in response to receiving the INVITE request message including the Net Trace Settings and after detecting the Net Trace Settings, to the trace collection entity 203 data representative of a network trace result data (e.g. Net Trace(XML)) associated with the SIP response message (e.g. 200 OK) that the first UE 206 will transmit to the AS 202 in response to the INVITE request message. The trace collection entity 203 receives and stores the network trace result data and, in step 217, the trace collection entity 203 sends an acknowledgement (e.g. OK) to the first UE 206. In step 218, the first UE 206 transmits the SIP response message (200 OK) to the AS 202.

In step 219, the AS 202 transmits, in response to receiving the acknowledgement response message (e.g. 200 OK) from the first UE 206, to the trace collection entity 203 data representative of a network trace result data (e.g. Net Trace (XML)) associated with an INVITE request message that the AS 202 will be transmitting to the second UE 207. In step 220, on receipt of an acknowledgement message (e.g. OK) from the trace collection entity 203, the AS 202 transmits a SIP INVITE request message towards the second UE 207 (e.g. INVITE B(Net Trace Settings)), where the INVITE request message is configured to include trace settings including the Net Trace Settings. These may be included in the INVITE request message as either XML Informational elements and/or as R-URI informational elements or parameters.

In step 221, the second network element 205 transmits, in response to receiving the INVITE request message associated with the second UE and on detecting the Net Trace settings, to the trace collection entity 203 data representative of a network trace result data (e.g. Net Trace(XML)) associated with the INVITE request message that the second network element 205 will be transmitting towards the second UE 207. In step 222, on receipt of an acknowledgement message (e.g. OK) from the trace collection entity 203, the second network element 205 transmits the SIP INVITE request message towards the second UE 207 (e.g. INVITE B(Net Trace Settings)), the INVITE request message including the Net Trace Settings.

In step 223, the second UE 207 transmits, in response to receiving the INVITE request message including the Net Trace Settings and after detecting the Net Trace Settings, to the trace collection entity 203 data representative of a network trace result data (e.g. Net Trace(XML)) associated with the SIP response message (e.g. 486 Busy Here) that the second UE 207 will transmit to the second network element 205 in response to the INVITE request message. The trace collection entity 203 receives and stores the network trace data and, in step 224, the trace collection entity 203 sends an acknowledgement (e.g. OK) to the second UE 207. In step 225, the second UE transmits the SIP response message (e.g. 486 Busy Here) to the second network element 205. In step 226, the second network element 205 transmits a SIP acknowledge message (e.g. ACK) to the second UE 207.

In step 227, the second network element 205 transmits, in response to receiving the SIP response message (e.g. 486 Busy Here) from the second UE 207 and in response to transmitting the SIP ACK (e.g. ACK) to the second UE 207, to the trace collection entity 203 data representative of a network trace result data (e.g. Net Trace(XML)) associated with the received SIP response message (e.g. 486 Busy Here) and the transmitted ACK to the second UE 207.

In step 228, (see FIG. 2*b*), the second UE 207 transmits, in response to receiving the SIP ACK (e.g. ACK) from the second network element 205, to the trace collection entity 203 data representative of a network trace result data (e.g. Net Trace(XML)) associated with the receipt of the SIP ACK (e.g. ACK) from the second network element 205. In step 229, on receipt of an acknowledgement message (e.g. OK) from the trace collection entity 203, the second network element 205 transmits the SIP response message associated with the second UE 207 (e.g. the 486 Busy Here) towards the AS 202. In step 230, in response to receiving the SIP response message from the second UE 207, the AS 202 transmits a SIP acknowledgement message (e.g. ACK) to the second network element 205. In step 231, the AS 202 transmits, in response to receiving the SIP response message from the second UE 207 in step 229 and/or in response to transmitting the SIP ACK to the second network element 205 in step 230, to the trace collection entity 203 data representative of a network trace result data (e.g. Net Trace (XML)) associated with the receipt of the SIP response message from the second UE 207 (e.g. 486 Busy Here) and/or with the SIP ACK transmitted to the second network element 205.

In step 232, the second network element 205 transmits, in response to transmitting the SIP response message from the second UE 207 in step 229 and/or in response to receiving the SIP ACK from the AS 202 in step 230, to the trace collection entity 203 data representative of a network trace result data (e.g. Net Trace(XML)) associated with the transmission of the SIP response message from the second UE 207 (e.g. 486 Busy Here) and/or with the receipt of the SIP ACK received from the AS 202.

In step 233, the AS 202 transmits, in response to receiving the SIP response message from the second UE 207 (e.g. the 486 Busy Here), towards the first UE 206 a call termination message (e.g. BYE). The first network element 204 receives the call termination message. In step 234, the first network element 204 transmits, in response to receiving the call termination message from the AS 202 in step 233, to the trace collection entity 203 data representative of a network trace result data (e.g. Net Trace(XML)) associated with the reception of the call termination message from the AS 202 (e.g. BYE). In step 235, in receipt of an acknowledgement message (e.g. OK) from the trace collection entity 203, the first network element transmits the call termination message towards the first UE 206.

In step 236, the first UE 206 transmits, in response to receiving the call termination message from the AS 202 via the first network element 204, to the trace collection entity 203 data representative of a network trace result data (e.g. Net Trace(XML)) associated with the reception of the call termination message from AS 202 and/or with the transmission of the SIP response message (200 OK) that will be transmitted towards the AS 202 in response to the call termination signal. In step 237, the first UE 206 transmits towards AS 202 the SIP response message (200 OK) in response to the call termination signal.

In step 238, the first network element 204 transmits, in response to receiving the SIP response message from the first UE 206 (e.g. 200 OK), to the trace collection entity 203 data representative of a network trace result data (e.g. Net Trace(XML)) associated with the reception of the SIP response message from the first UE 206 and/or with the SIP response message that will be transmitted towards the AS 202. In step 237, the first UE 206 transmits, in response to receiving an acknowledgement message from the trace collection entity 203, towards AS 202 the SIP response message (200 OK) from the first UE 206.

In step 240, on receipt of the SIP response message (200 OK) from the first UE 206, the AS 202 transmits a call termination message (e.g. an end of call message or Click to dial call finished message) to the customer care unit 201 indicating that the trace session is complete. In step 241, the customer care unit 201 transmits a result request message (e.g. Fetch Net Trace result) to the trace collection entity 203 for fetching the data representative of the stored network trace result data associated with the trace session that the trace collection entity 203 has collected. In step 242, the trace collection entity 203 transmits a result response message (e.g. OK(Result)) including the data representative of the collected results for use by the customer care unit or an operator in analysing the network. The collected results may also be fetched from the first UE 206 by the network or a network entity or application (e.g. an element manager or a customer care centre application or node 201) suitable for analysing the network trace session. In addition, the first UE 206 may not need to fetch the trace result data from the trace collection entity 203, the stored result data may be fetched from the disk/database/storage device on the trace collection entity 203 by another network entity or application requiring the stored result data. In this case, the first UE 206 may simply notify the network entity or application that the trace session has completed.

Figure 3:
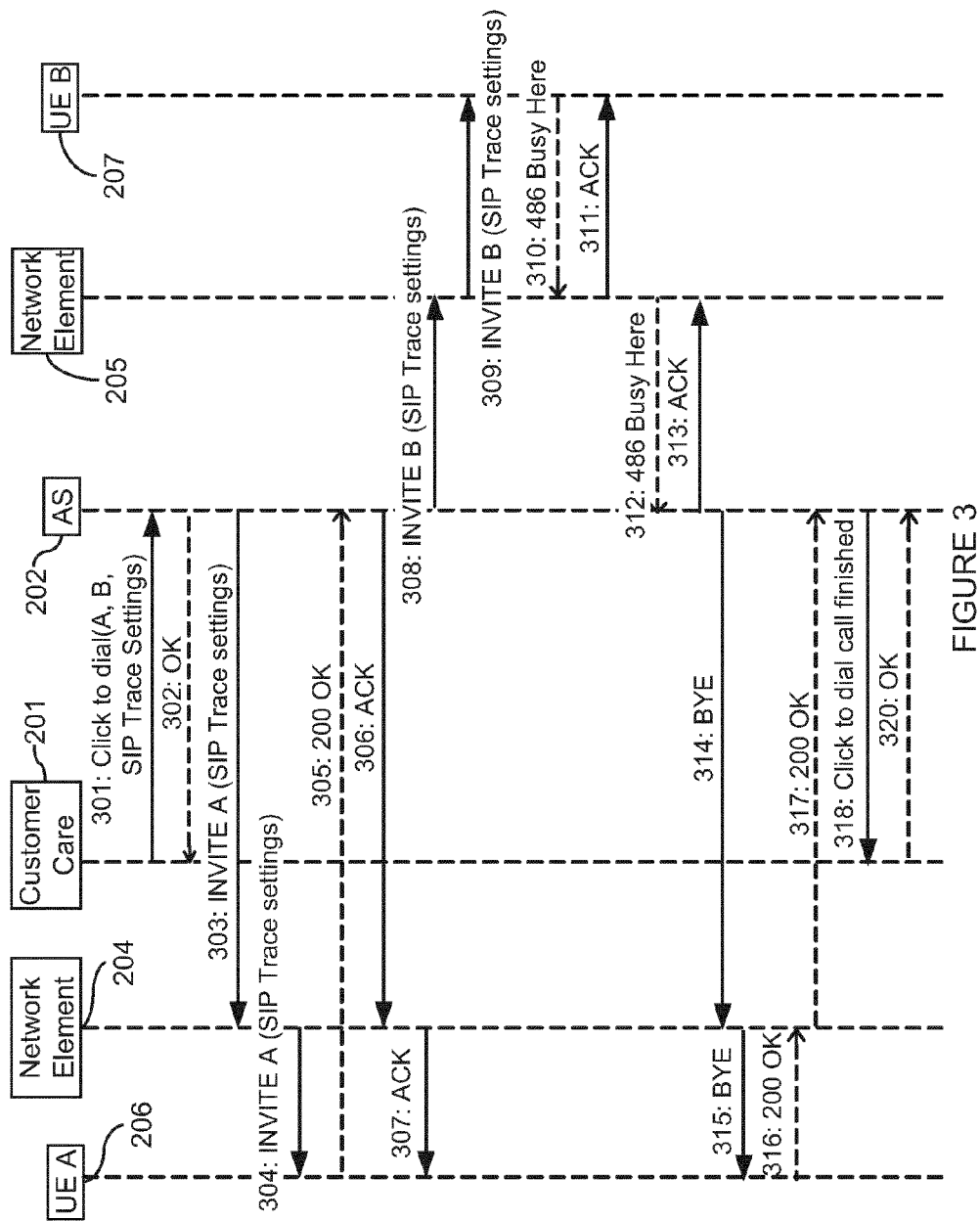
FIG. 3 is a signalling flow diagram illustrating an example of a SIP trace session according to the invention.

FIG. 3 is a signalling flow diagram illustrating another example process 300 of a trace session according to the invention. In this example, the trace session is a SIP Trace based trace session. For simplicity, the reference numerals of FIGS. 2a and 2b will be used for the same or similar network elements, user equipment, or devices. The telecommunications network includes a trace session initiator comprising a customer care unit 201 and/or an element manager, an AS 202, a first and second network element 204 and 205, and a first UE (e.g. UE-A) and a second UE (e.g. UE-B) 206 and 207. For simplicity, this example only includes a first and a second network element 204 and 205, however, it is to be appreciated that a plurality of network elements may be located within the communications path between the AS 202 and the first and/or second UEs 206 and 207.

In step 301, the customer care unit 201 may trigger a trace session by sending an activation request message (e.g. Click_to_Dial(A, B, SIP Trace settings)) including trace settings such as SIP trace settings to AS 202. The activation request message includes identifiers representing the identities of the first UE 206 (UE A) and the second UE 207 (UE B). In step 302, AS 202 responds with an acknowledgement message (e.g. OK) indicating to the customer care unit 201 that the corresponding trace session has been activated.

On receipt of the activation request message at the AS 202 an INVITE request message(s) is triggered for a call between the first and the second UEs 206 and 207. In step 303, the AS 202 transmits a SIP INVITE request message towards the first UE 206 (e.g. INVITE A(SIP Trace Settings)), where the SIP INVITE request message is configured to include trace settings including the SIP Trace Settings. These may be included in the INVITE request message as either XML Informational elements and/or as R-URI informational elements.

In step 304, the first network element 204 transmits, in response to receiving the SIP INVITE request message associated with the first UE and on detecting the SIP Trace settings, the SIP INVITE request message towards the first UE 206 (e.g. INVITE A(SIP Trace Settings)), the INVITE request message includes the SIP Trace Settings.

In step 305, the first UE 206 transmits, in response to receiving the INVITE request message including the SIP Trace Settings and after detecting the SIP Trace Settings, the SIP response message (e.g. 200 OK) to the AS 202. In step 306, in response to receiving the SIP response message from the first UE 206, the AS 202 transmits a SIP acknowledgement message (e.g. ACK) towards the first UE 206, which is received by the first network element 204. In step 307, the first network element 204 transmits the SIP acknowledgement message (e.g. ACK) towards the first UE 206.

After transmitting the SIP acknowledgement message towards the first UE 206, in step 308 the AS 202 transmits a SIP INVITE request message towards the second UE 207 (e.g. INVITE B(SIP Trace Settings)), where the INVITE request message is configured to include trace settings including the SIP Trace Settings. These may be included in the SIP INVITE request message as either XML Informational elements and/or as R-URI informational elements or parameters.

In step 309, the second network element 205 transmits, in response to receiving the SIP INVITE request message associated with the second UE 207 and on detecting the SIP Trace settings, the SIP INVITE request message towards the second UE 207 (e.g. INVITE B(SIP Trace Settings)), the INVITE request message including the SIP Trace Settings. The second UE 207 answers the call based on the SIP Trace Settings, which include a response code (e.g. 486 Busy Here or any other indication/message that may be used) for use by the second UE 207. The SIP Trace Settings may indicate to the second UE 207 that it should answer the call silently, e.g. by not disturbing the user of the second UE 207. In step 310, the second UE 207 transmits a SIP response message based on the received SIP Trace settings (e.g. 486 Busy Here) towards the AS 202. In step 311, in response to receiving the SIP response message from the second UE 207, the second network element 205 transmits a SIP acknowledgement message towards the second UE 207. The second UE 207 then terminates its end of the call. In step 312, the second network element 205 transmits the SIP response message associated with the second UE 207 (e.g. 486 Busy Here) towards the AS 202. In step 313, in response to receiving the SIP response message from the second UE 207, the AS 202 transmits a SIP acknowledgement message (e.g. ACK) to the second network element 205. This completes the call between the first and the second UEs 206 and 207 and the AS 202 proceeds to terminate the call between the first and the second UEs 206 and 207.

In step 314, the AS 202 transmits, in response to receiving the SIP response message from the second UE 207 (e.g. the 486 Busy Here), towards the first UE 206 a call termination message (e.g. BYE). The first network element 204 receives the call termination message and in step 315, the first network element 204 transmits the call termination message towards the first UE 206.

On receipt of the call termination message at the first UE 206, in step 316, the first UE 206 transmits towards AS 202 the SIP response message (200 OK) in response to the call termination message. The first UE 206 then terminates its end of the call. In step 317, the first network element 204 transmits, in response to receiving the SIP response message from the first UE 206 (e.g. 200 OK), towards AS 202 the SIP response message (200 OK) from the first UE 206. In step 318, on receipt of the SIP response message (200 OK) from the first UE 206, the AS 202 transmits a call termination message (e.g. end of call message or a Click to dial call finished message) to the customer care unit 201 indicating that the SIP trace session is complete and has terminated successfully. In step 320, the customer care unit 201 transmits SIP response message (e.g. OK) to the AS 202 acknowledging that the trace session is terminated.

Figure 4A:
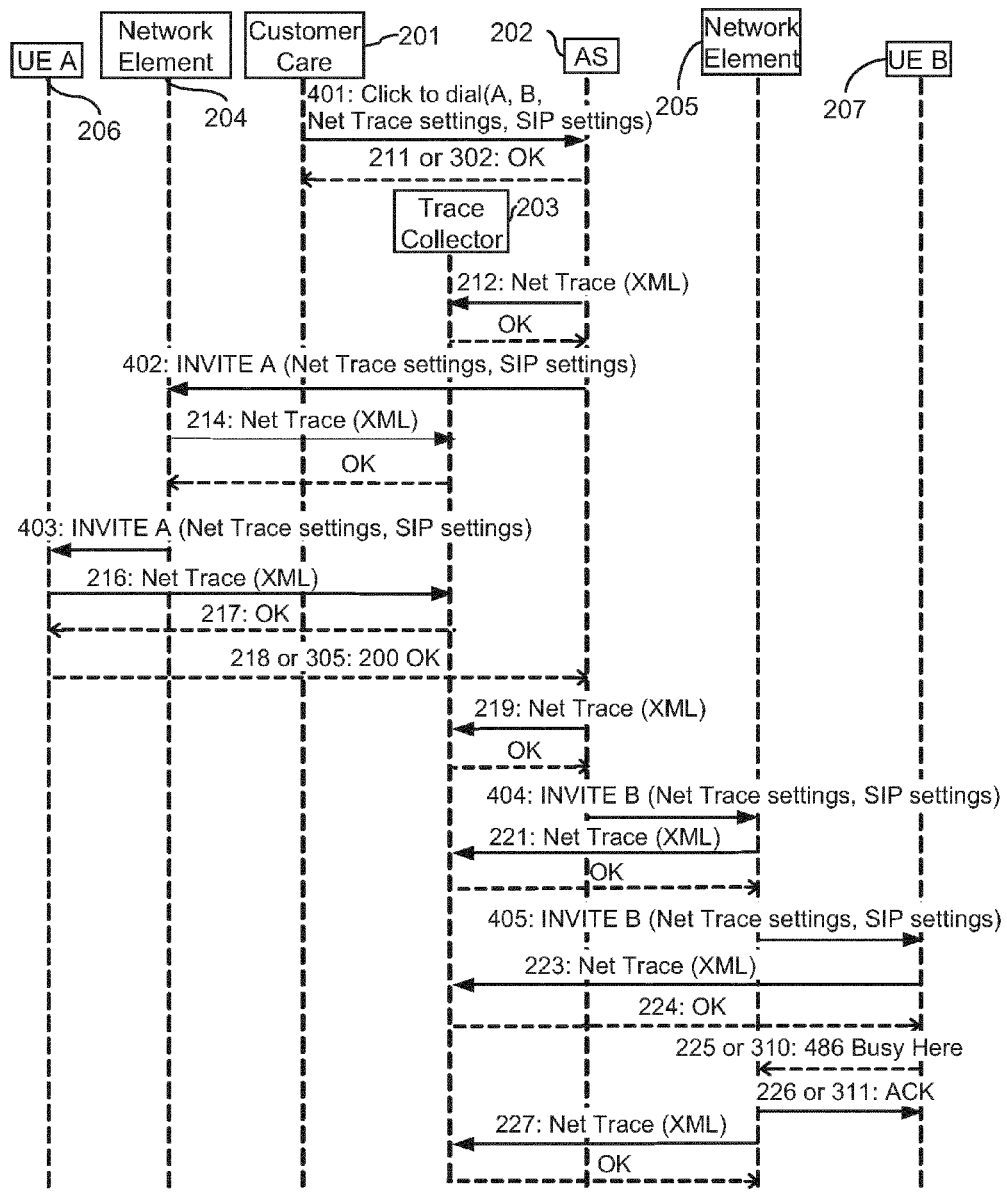
FIGS. 4a and 4b are signalling flow diagrams illustrating an example of a combined Net Trace and SIP trace session according to the invention.
Figure 4B:
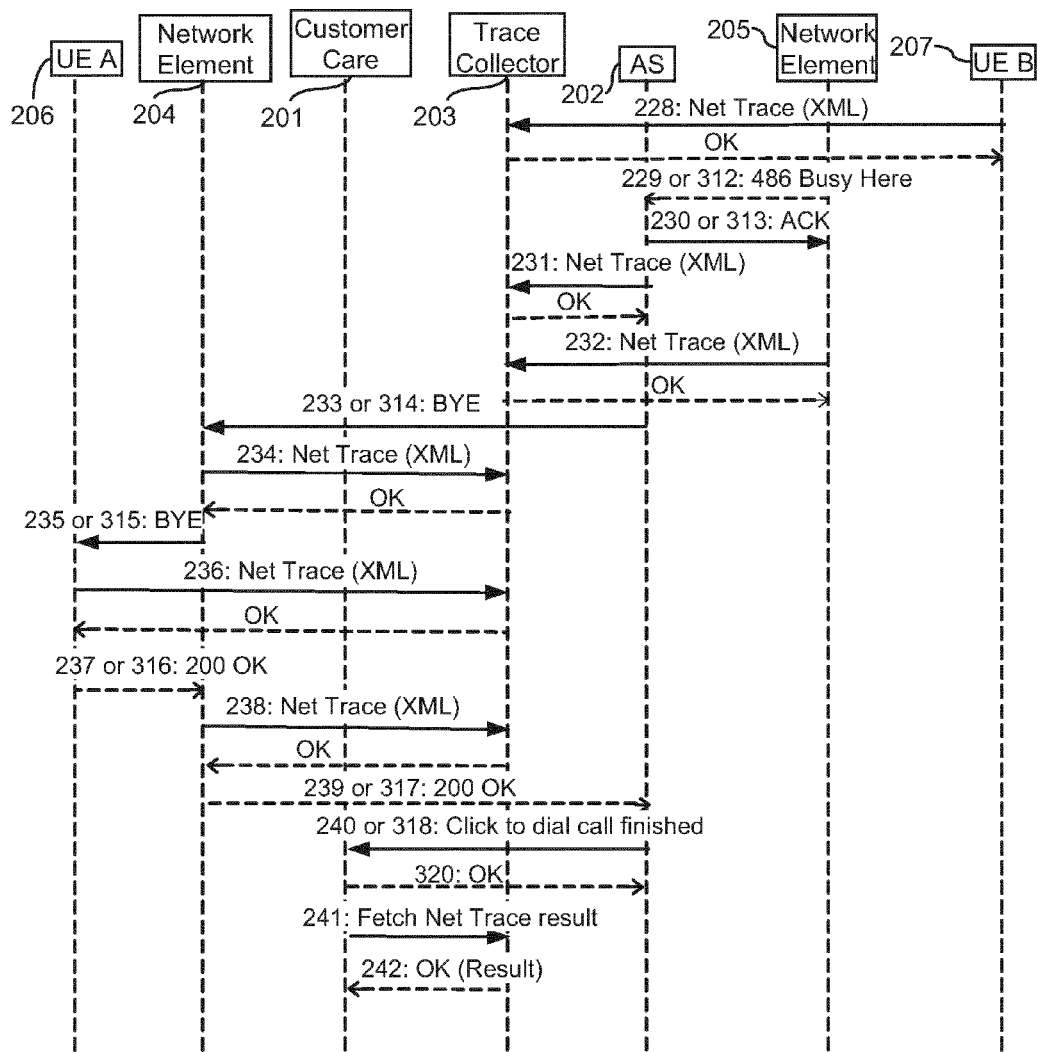

FIGS. 4*a* and 4*b* illustrate a call signalling flow diagram illustrating another example process including a combined Net Trace session and SIP Trace session. For simplicity, the reference numerals of similar or the same steps as outlined in the example processes of FIGS. 2*a*, 2*b* and 3 relating to Net Trace and SIP Trace sessions will be referred to where necessary. As well, the reference numerals of FIGS. 2*a* and 2*b* will be used for the same or similar network elements, user equipment, or devices. In this example, the trace session is a combined Net Trace and SIP Trace based trace session in which the telecommunications network includes a trace session initiator comprising a customer care unit 201 and/or an element manager, an AS 202, a first and second network element 204 and 205, and a first UE (e.g. UE-A) and a second UE (e.g. UE-B) 206 and 207. For simplicity, this example only includes a first and a second network element 204 and 205, however, it is to be appreciated that a plurality of network elements may be located within the communications path between the AS 202 and the first and/or second UEs 206 and 207.

In step 401, the customer care unit 201 triggers a trace session by sending an activation request message (e.g. Click_to_Dial(A, B, Net Trace settings, SIP Trace settings)) to AS 202, the activation request message includes trace settings for a combined trace session comprising Net Trace settings and SIP trace settings. The activation request message includes identifiers representing the identities of the first UE 206 (UE A) and the second UE 207 (UE B). The process continues following steps 211 or 302 and 212 of FIG. 2*a*, 2*b* or 3 according to the Net Trace and/or SIP Trace settings.

On receipt of the activation request message at the AS 202 an INVITE request message(s) is triggered for a call between the first and the second UEs 206 and 207. In step 402, the AS 202 transmits a SIP INVITE request message towards the first UE 206 (e.g. INVITE A(Net Trace settings, SIP Trace Settings)), where the INVITE request message is configured to include trace settings including Net Trace and SIP Trace Settings. The Net Trace settings may be included in the INVITE request message as either XML Informational elements and/or as R-URI informational elements as described previously. The SIP Trace settings may also be included in the INVITE request message as either XML Informational elements and/or as R-URI informational elements as described previously. The process continues following step 214 according to the Net Trace settings.

In step 403, the first network element 204 transmits, in response to receiving the INVITE request message associated with the first UE and on detecting the Net Trace and SIP Trace settings, the SIP INVITE request message towards the first UE 206 (e.g. INVITE A(Net Trace Settings, SIP Trace Settings)), the INVITE request message includes the Net Trace Settings and the SIP Trace Settings. The process continues following at least one of the steps 216, 217, 218 or 305, 219, 306 and 307 of FIG. 2*a*, 2*b* or 3 according to the Net Trace and/or SIP Trace settings.

In step 404 the AS 202 transmits a SIP INVITE request message towards the second UE 207 (e.g. INVITE B(Net Trace Settings, SIP Trace Settings)), where the INVITE request message is configured to include trace settings including Net Trace and SIP Trace Settings. The Net Trace settings may be included in the INVITE request message as either XML Informational elements and/or as R-URI informational elements as described previously. The SIP Trace settings may also be included in the INVITE request message as either XML Informational elements and/or as R-URI informational elements as described previously. When the INVITE message associated with the second UE 207 is received by the second network element 205, and on detecting Net Trace settings within the INVITE message, the process may continue following step 221 according to the Net Trace settings.

In step 405, the second network element 205, in response to receiving the INVITE request message associated with the second UE 207 and after detecting the Net Trace and SIP Trace settings, transmits the SIP INVITE request message towards the second UE 207 (e.g. INVITE B(Net Trace Settings, SIP Trace Settings)), where the INVITE request message includes the Net Trace and SIP Trace Settings. The second UE is configured, on receiving the SIP INVITE message from the AS 202 (e.g. INVITE B(Net Trace Settings, SIP Trace Settings), to detect the Net Trace settings and SIP Trace settings within the INVITE message. Based on the Net Trace and SIP Trace settings, as illustrated in FIGS. 4*a* and 4*b* the process continues following at least one of the steps 310 to 320 and/or steps 223 to 242 of the trace sessions of FIG. 2*a*, 2*b*, or 3 according to the Net Trace and/or SIP Trace settings.

Figure 5A:
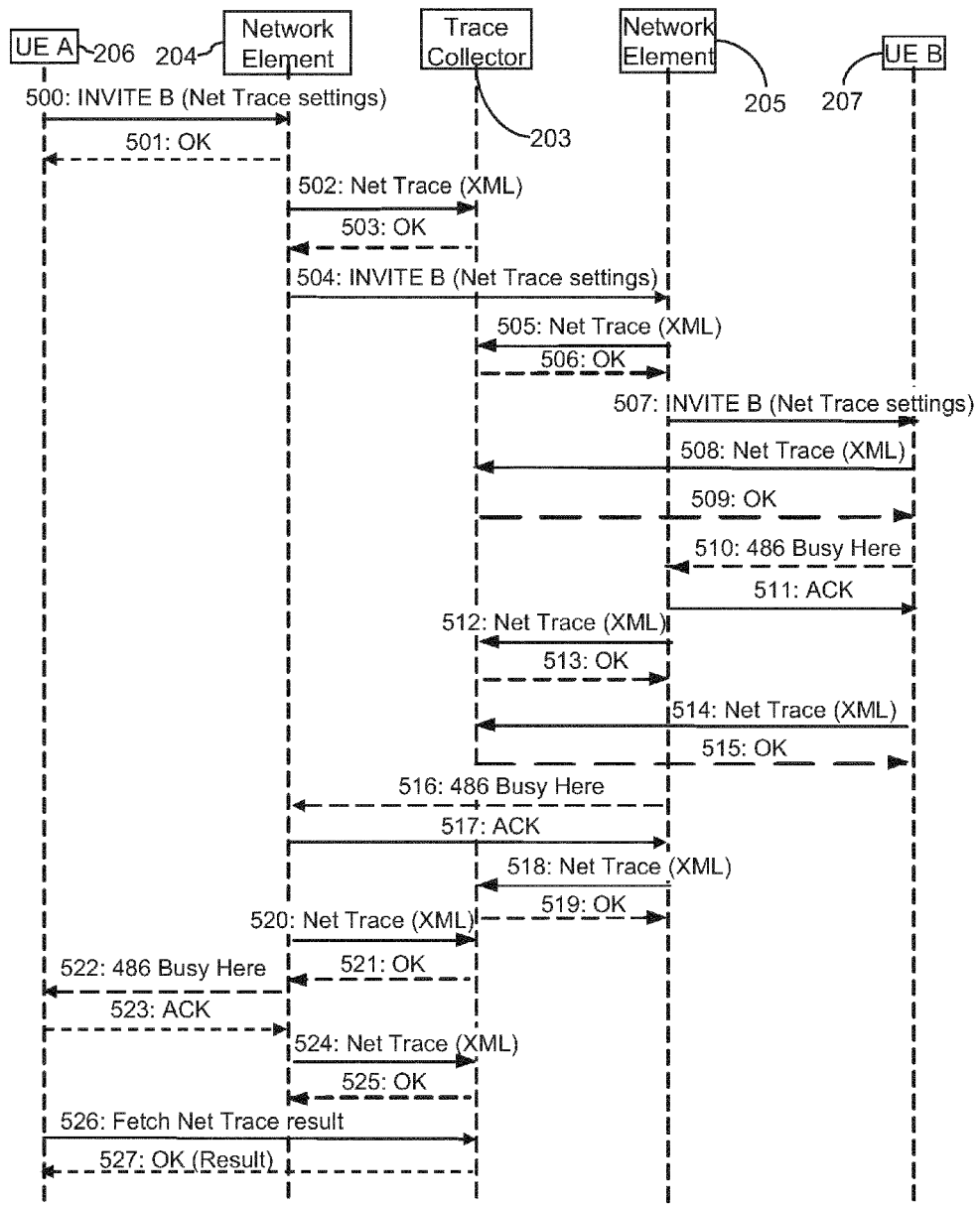
FIGS. 5a and 5b are signalling flow diagrams illustrating an alternative trace session initiator for activating a trace session associated with UE A and UE B according to the invention.
Figure 5B:
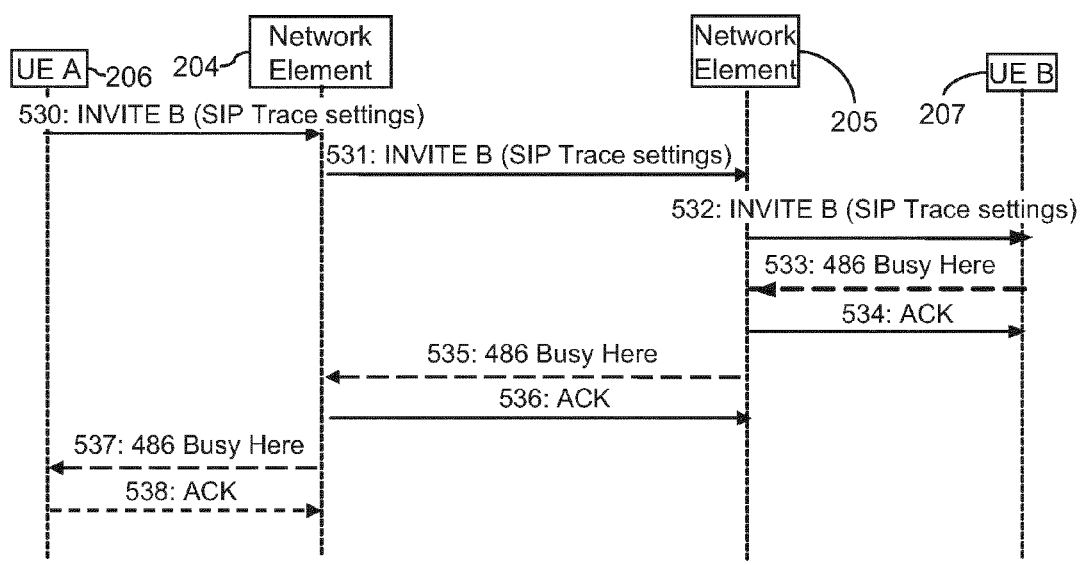

FIGS. 5*a* and 5*b* are call signalling flow diagrams illustrating example processes of a Net Trace session and a SIP Trace session, respectively, in accordance with the invention. In these examples, the trace session initiator is the first UE (e.g. UE-A) 206, which is configured with the capability of triggering a trace session. The first UE 206 can be configured for inputting trace settings (e.g. Net Trace settings and/or SIP Trace settings) and for sending a trace activation message including the trace settings towards a second UE (e.g. UE-B) 207 via one or more network elements that include the AS 202. For each network element, detection of the trace settings may trigger the network element to respond to the trace session as defined by the trace settings. For a Net Trace session, the first UE 206 may also be configured to receive trace result data from a trace collector 203 on receiving a response from the second UE 207.

FIG. 5a is a call signalling flow diagram illustrating an example process of a Net Trace session according to the invention in which the trace session initiator is the first UE 206. In step 500, the first UE 206 triggers a trace session by sending an activation request message (e.g. INVITE B (Net Trace settings)) towards the second UE 207 via one or more network element(s) (e.g. these may include network elements 204, 205 and AS 202). For simplicity, only a first and a second network element 204 and 205 are shown. The activation request message includes trace settings such as Net Trace settings for the Net Trace session. These settings may be included within the body of the INVITE message or within R-URI parameters of the INVITE message. The trace settings may have been input by the user (e.g. a field technician) of the first UE 206 or may have been received by the first UE 206 from another device or apparatus in the network. The activation request message includes identifiers representing the identities of at least the second UE 207 (UE-B) and other trace settings as previously described. In this example, the activation request message is the SIP INVITE message associated with the second UE 207 including the trace settings (e.g. INVITE B (Net Trace settings)). However, it is to be appreciated that the activation request message may be any other message suitable for triggering the network elements in the communications path between the first UE 206 and the second UE 207 to respond according to the trace settings and the trace session.

On receiving the SIP INVITE message including the Net Trace settings, the first network element 204 detects the Net Trace settings and determines that a trace session is in progress. In step 501, network element 204 responds with an acknowledgement message (e.g. OK) indicating to the first UE 206 receipt of the SIP INVITE request message. In step 502, network element 204 transmits, in response to receiving the activation request message, to the trace collection entity 203 data representative of network trace result data (e.g. Net Trace(XML)) associated with the INVITE request message (e.g. INVITE B(Net Trace settings)) that the network element 204 will be transmitting towards the second UE 207. In this example, the network trace result data is sent using the XML format. In step 503, on receipt of an acknowledgement message (e.g. OK) from the trace collection entity 203, the first network element 204 transmits the SIP INVITE request message towards the second UE 207 (e.g. INVITE B(Net Trace Settings)).

In response to receiving the SIP INVITE request message associated with the second UE 207 and on detecting the Net Trace settings, the second network element 205 transmits, in step 504, network trace result data (e.g. Net Trace(XML)) to the trace collection entity 203. The network trace result data associated with the SIP INVITE request message that the second network element 205 will be transmitting towards the second UE 207. In step 505, on receipt of an acknowledgement message (e.g. OK) from the trace collection entity 203, the second network element 205 transmits the SIP INVITE request message towards the second UE 207 (e.g. INVITE B(Net Trace Settings)), the SIP INVITE request message includes the Net Trace Settings.

In response to receiving the SIP INVITE request message including the Net Trace Settings (e.g. INVITE B(Net Trace Settings)) and after detecting the Net Trace Settings, the second UE 207 transmits, in step 506, to the trace collection entity 203 data representative of network trace result data (e.g. Net Trace(XML)) associated with the SIP response message (e.g. 486 Busy Here) that the second UE 207 will transmit towards the first UE 206 via the second network element 205. The SIP response message is in response to the SIP INVITE request message including the trace settings. The SIP response message may be based on the trace settings as described previously. The trace collection entity 203 receives and stores the network trace result data and sends an acknowledgement message (e.g. OK) to the second UE 207. In step 507, the second UE 207 transmits the SIP response message (e.g. 486 Busy Here) to the second network element 205. In step 508, the second network element 205 transmits a SIP acknowledge message (e.g. ACK) to the second UE 207, acknowledging receipt of the SIP response message.

In response to receiving the SIP response message (e.g. 486 Busy Here) from the second UE 207 and in response to transmitting the SIP ACK (e.g. ACK) to the second UE 207, the second network element 205 transmits, in step 509, to the trace collection entity 203 data representative of a network trace result data (e.g. Net Trace(XML)) associated with the received SIP response message (e.g. 486 Busy Here) and the transmitted ACK to the second UE 207.

In response to receiving the SIP ACK (e.g. ACK) from the second network element 205, the second UE 207 transmits, in step 510, to the trace collection entity 203 data representative of a network trace result data (e.g. Net Trace(XML)) associated with the receipt of the SIP ACK (e.g. ACK) from the second network element 205. In step 511, on receipt of an acknowledgement message (e.g. OK) from the trace collection entity 203, the second network element 205 transmits the SIP response message associated with the second UE 207 (e.g. the 486 Busy Here) towards the first UE 206. In response to receiving the SIP response message from the second UE 207, the first network element 204 transmits, in step 513, a SIP acknowledgement message (e.g. ACK) to the second network element 205.

In response to transmitting the SIP response message from the second UE 207 in step 512 and/or in response to receiving the SIP ACK from the first network element 204 in step 513, the second network element 205 transmits, in step 514, to the trace collection entity 203 data representative of a network trace result data (e.g. Net Trace(XML)) associated with the transmission of the SIP response message from the second UE 207 (e.g. 486 Busy Here) and/or with the receipt of the SIP ACK received from the first network element 204.

In addition, in response to receiving the SIP response message from the second UE 207 in step 512 and/or in response to transmitting the SIP ACK to the second network element 205 in step 513, the first network element 204 transmits, in step 515, to the trace collection entity 203 data representative of network trace result data (e.g. Net Trace (XML)) associated with the receipt of the SIP response message from the second UE 207 (e.g. 486 Busy Here) and/or with the SIP ACK transmitted to the second network element 205.

In step 516, on receipt of an acknowledgement message (e.g. OK) from the trace collection entity 203, the first network element 204 transmits the SIP response message associated with the second UE 207 (e.g. the 486 Busy Here) towards the first UE 206. In step 517, the first UE 206 transmits a SIP acknowledge message (e.g. ACK) to the first network element 204, acknowledging receipt of the SIP response message.

In response to transmitting the SIP response message from the second UE 207 in step 516 and/or in response to receiving the SIP ACK from the first UE 206 in step 517, the second network element 205 transmits, in step 518, to the trace collection entity 203 data representative of a network trace result data (e.g. Net Trace(XML)) associated with the transmission of the SIP response message from the second UE 207 (e.g. 486 Busy Here) and/or with the receipt of the SIP ACK received from the first UE 206.

In step 519, the first UE 206 transmits a result request message (e.g. Fetch Net Trace result) to the trace collection entity 203 for fetching the data representative of the stored network trace result data associated with the trace session that the trace collection entity 203 has collected from the network elements 204 and 205 and the second UE 207. In step 520, the trace collection entity 203 transmits a result response message (e.g. OK(Result)) including the data representative of the collected results for use in analysing the network trace session. The collected results may also be fetched from the first UE 206 by the network or a network entity or application (e.g. an element manager or a customer care centre application or node 201) suitable for analysing the network trace session. In addition, the first UE 206 may not need to fetch the trace result data from the trace collection entity 203, the stored result data may be fetched from the disk/database/storage device on the trace collection entity 203 by another network entity or application requiring the stored result data. In this case, the first UE 206 may simply notify the network entity or application that the trace session has completed.

FIG. 5b is a call signalling flow diagram illustrating an example process of a SIP Trace session according to the invention in which the first UE (e.g. UE-A) 206 is the trace session initiator. In step 530, the first UE 206 triggers a trace session by sending an activation request message (e.g. INVITE B (SIP Trace settings)) towards the second UE (e.g. UE-B) 207 via first and second network elements 204 and 205. The activation request message includes trace settings such as SIP Trace settings for the SIP Trace session. The trace settings may have been input by the user (e.g. a field technician) of the first UE 206 or may have been received by the first UE 206. The activation request message includes identifiers representing the identity of the second UE 207.

In steps 531 and 532, the first and second network elements 204 and 205 receive and forward the SIP INVITE request message including the SIP Trace settings towards the second UE 207. On receipt of the SIP INVITE request message, the second UE 207 detects the SIP Trace settings and answers the call based on the SIP Trace settings. The SIP Trace settings may include a response code (e.g. 486 Busy Here) or any other indication/message for use by the second UE 207 when responding to the SIP INVITE request message sent from the first UE 206. The SIP Trace Settings may include an indication to the second UE 207 that it should answer the call silently, e.g. by not ringing or disturbing the user of the second UE 207 in any way. In step 533, the second UE 207 transmits a SIP response message based on the received SIP Trace settings (e.g. 486 Busy Here) towards the first UE 206. In step 534, in response to receiving the SIP response message from the second UE 207, the second network element 205 transmits a SIP acknowledgement message (e.g. ACK) towards the second UE 207. The second UE 207 may then terminate its end of the call. In step 535, the second network element 205 transmits the SIP response message associated with the second UE 207 (e.g. 486 Busy Here) towards the first UE 206 via the first network element 204. In step 536, in response to receiving the SIP response message from the second UE 207, the first network element 204 transmits a SIP acknowledgement message (e.g. ACK) to the second network element 205. In step 537, the first network element 204 transmits the SIP response message associated with the second UE 207 (e.g. 486 Busy Here) towards the first UE 206, which indicates to the first UE 206 that the SIP trace session is complete and has terminated successfully. The first UE 206 transmits a SIP acknowledgement message (e.g. ACK) to the first network element 204.

In a combined Net Trace and SIP Trace session according to the invention, when the first UE 206 is a trace session initiator, the first UE 206 triggers a trace session by sending an activation request message (e.g. INVITE B(Net Trace settings, SIP Trace settings)) towards the second UE 207 via the first network element 206, the activation request message includes trace settings such as Net Trace settings and SIP Trace settings for the combined trace session. The trace settings may have been input by the user (e.g. a field technician) of the first UE 206 or may have been received by the first UE 206. The activation request message may include identifiers representing the identities of the first UE 206 (UE A) and the second UE 207 (UE B). The combined Net Trace and SIP Trace process continues in line with steps 500 to 538 as outlined in FIGS. 5a and 5b according to the Net Trace and SIP Trace settings.

Figure 6:
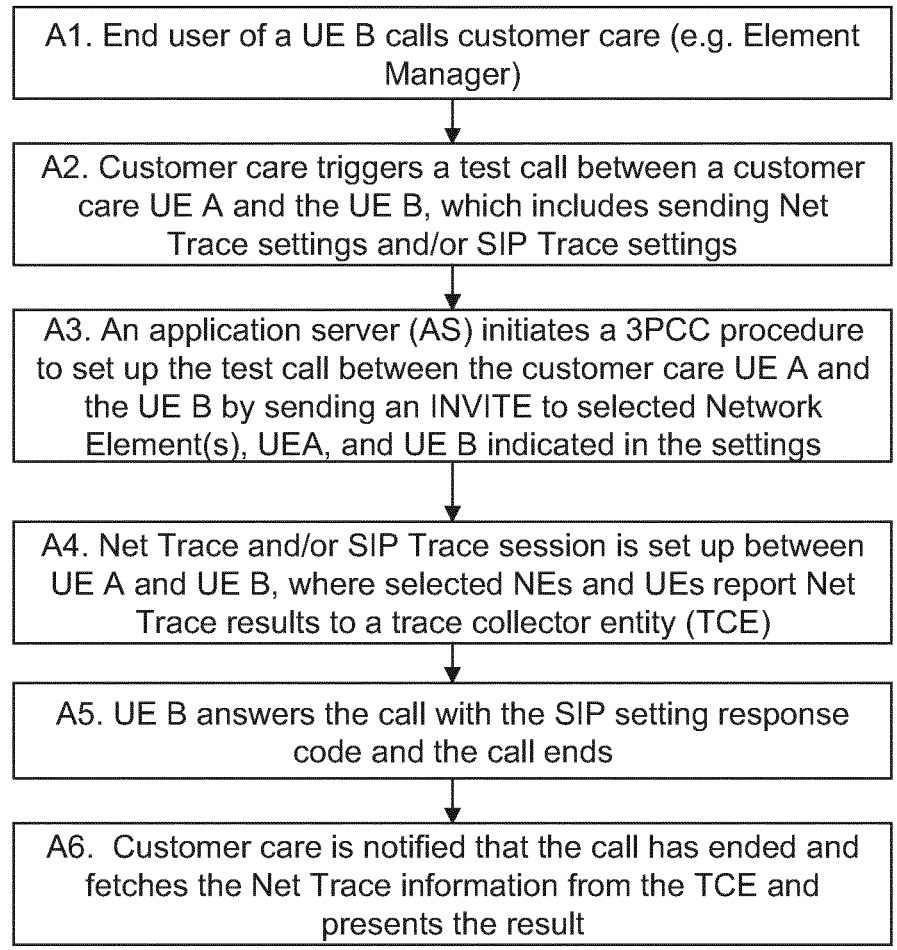
FIG. 6 illustrates a flow diagram illustrating an example process for a trace session associated with a UE A and a UE B according to the invention.

FIG. 6 is a flow diagram illustrating an example process according to the invention for performing a trace session associated with a UE A and a UE B according to the invention. The steps performed are as follows:

A1. An end user of UE B calls customer care (e.g. an element manager) as the end user may be experiencing poor coverage, network performance or any other network or UE related problem.

A2. Customer care can trigger a test call between a customer case UE, e.g. UE A, and UE B of the end user, which includes sending trace settings such as Net Trace settings and/or SIP Trace settings. These trace settings may include a selection of the network elements that are to be involved in the trace session. By way of example only, these network elements may include, but are not limited to, ASs, CSCFs, HSSs, Serving Gateways (SGWs), Gateway General Packet Radio Service (GPRS) Support Nodes (GGSNs), Serving GPRS Support Nodes (SSGN), Session Border Gateways (SBGs), Media Resource Functions (MRFs), Media Gateways (MGs/MGWs), Media Servers (MSs), Media Gateway control Functions (MGCFs), Breakout Gateway Control Functions (BGCFs), Evolved Node Bs (eNBs), Radio Base Stations (RBSs), Radio Network Controllers (RNCs), Node Bs, Signaling Gateways (SGWs), or Mobility Management Entities (MMEs) and the like. The customer care initiates the test call in the network by signaling the A and B numbers of UE-A and UE-B. This may be performed by the element manager associated with customer care sending a Click to Dial message including Net Trace settings and SIP settings to a Click to Dial AS, or any other AS configured for controlling a trace session. This can be done over an extended Parlay X interface with Make- CallSession or via any other north bound interface between the customer care equipment and the Click to Dial AS.

A3. The AS may initiate a Third Party Call Control (3PCC) procedure to set up the test call between the customer care UE A and the UE B by sending an INVITE request message towards UE A and UE B via selected network elements, which may be indicated in the trace settings.

A4. When a Net Trace and/or a SIP Trace session is set up between UE A and UE B, selected network elements and the UEs may report Net Trace results to a trace collector entity.

As an example in a Net Trace session, the Net Trace actions for network elements may include each network element involved in the trace session to examine the trace session related signaling, for example the INVITE request message, and to determine whether for this trace session the network element shall report Net Trace and if so sends the Net Trace information to trace collection entity (e.g. the Net Trace Collector) in accordance with the given Net Trace settings in the incoming signaling. The Net Trace actions for UEs may include the UEs examining the session related signaling, for example the INVITE request message, and then determining if the UE in this trace session shall report Net Trace and if so sends the Net Trace information to the Net Trace Collector in accordance with the given Net Trace settings in the incoming signaling.

As another example in a SIP trace session, the SIP actions may require each network element that are involved in the trace session to examine the session related signaling, for example the INVITE request message, and to determine if the INVITE shall be answered, and if so, with what response code. If required, the network element may add a warning header if the INVITE request message is to be sent further as if it was a normal call. The SIP actions for UEs may include the UEs examining the session related signaling, for example the INVITE request message, and determines if the INVITE request message shall be answered, and if so, with what response code and adds a warning header if required, or if the INVITE request message indicates the UE may generate a normal ring signal, unless the ring signal is turned off, and alert user B.

A5. UE B may answer the call with the SIP setting response code (e.g. a 486 code) and the call then ends.

A6. Customer Care is then notified when the test call has ended and is then fetches the collected data or Net Trace information from the trace collection entity (e.g. the Net Trace Collector), which presents the results.

Although customer care may be involved in activating a trace session, it is to be appreciated that a trace session may be activated by a support person such as a field technician initiating a test call using UE A, which is capable of including Net Trace settings and/or SIP settings for triggering an AS to include these settings in an initial INVITE request message associated with UE-B to trigger the Net Trace or SIP response functionality in the network.

Figure 7A:
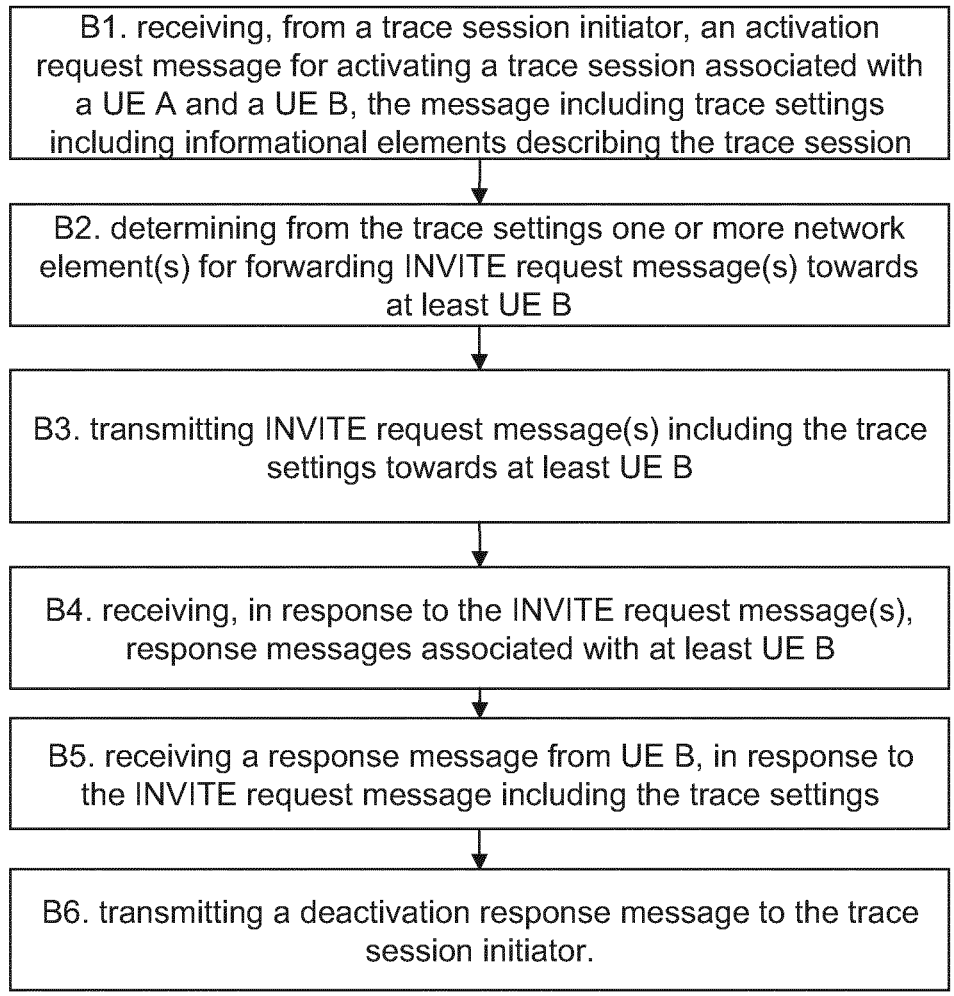
FIG. 7a illustrates a flow diagram illustrating an example process for an application server in controlling a trace session according to the invention.

FIG. 7a is a flow diagram illustrating another example process for operating an AS according to the invention for performing a trace session associated with a first UE (UE A) and a second UE (UE B) in a telecommunications network. It is to be appreciated that in this example, the in a telecommunications network comprises an IMS network, the first UE and the second UE. The IMS network includes the AS for controlling the trace session. The trace session is associated with the first and second UEs. Examples of traces sessions include, but are not limited to, a Net Trace session, a SIP Trace session, and/or a combined Net Trace and SIP Trace session. The process performs the following steps:

B1. Receiving from a trace session initiator an activation request message for activating the trace session. The activation request message including trace settings comprising informational elements describing the trace session. The trace session initiator may be a network element, equipment of a customer care centre, or even another UE, for example, the first UE. The trace session initiator may comprise an element manager associated with a customer care centre, where the first UE is associated with the element manager, a support person, or a field technician and the second UE is associated with a user. The trace settings may include settings for configuring a Net Trace session, a SIP Trace session, a combined Net Trace and SIP Trace session, or any other network trace session.

B2. Determining, from the trace settings, one or more network elements for use in forwarding SIP INVITE request message(s) towards at least the second UE. In the above examples, SIP INVITE request message(s) were forwarded to both the first and the second UE. However, if the trace initiator is the first UE, then there is no need for the AS to transmit a SIP INVITE towards the first UE. Determining may further include determining the capabilities of the network elements for use in tailoring the SIP INVITE request message(s) to enable the network elements in the communications path between the AS and the first and second UEs to respond to the trace session according to the trace settings.

B3. Transmitting INVITE request message(s) including the trace settings towards the first and second UEs. The INVITE request messages may be used for a call set-up between the first and second UEs.

The trace settings may be inserted into at least one of the SIP INVITE message(s) as XML Informational elements within the body of at least one of the INVITE request messages. Alternatively or in addition to, the trace settings may be inserted into at least one of the SIP INVITE message(s) as R-URI informational elements. The network elements and UEs may be configured for detecting the trace settings in the SIP INVITE message(s), and the AS may, depending on the type of network elements and UEs format the trace settings in the SIP INVITE message(s) so that the required network elements and UEs can detect the trace settings and response to the trace session accordingly.

The telecommunications network may further comprise a first network element in the communication path between the AS and the first UE and a second network element in the communication path between the AS and the second UE. Transmitting INVITE request messages towards the first and second UEs may include transmitting a first INVITE request message associated with the first UE to the first network element, in which the first INVITE request message includes the trace settings for the trace session, and transmitting a second INVITE request message associated with the second UE to the second network element, in which the second INVITE request message includes trace settings for the trace session.

B4. Receiving, in response to the INVITE request messages, response messages associated with, or from, the first and second UEs.

B5. Receiving a SIP response message from the second UE, in response to the INVITE request message associated with the second UE.

B6. Transmitting a deactivation response message, to the trace session initiator, for deactivating the trace session based on receiving the SIP response message from the second UE.

Figure 7B:
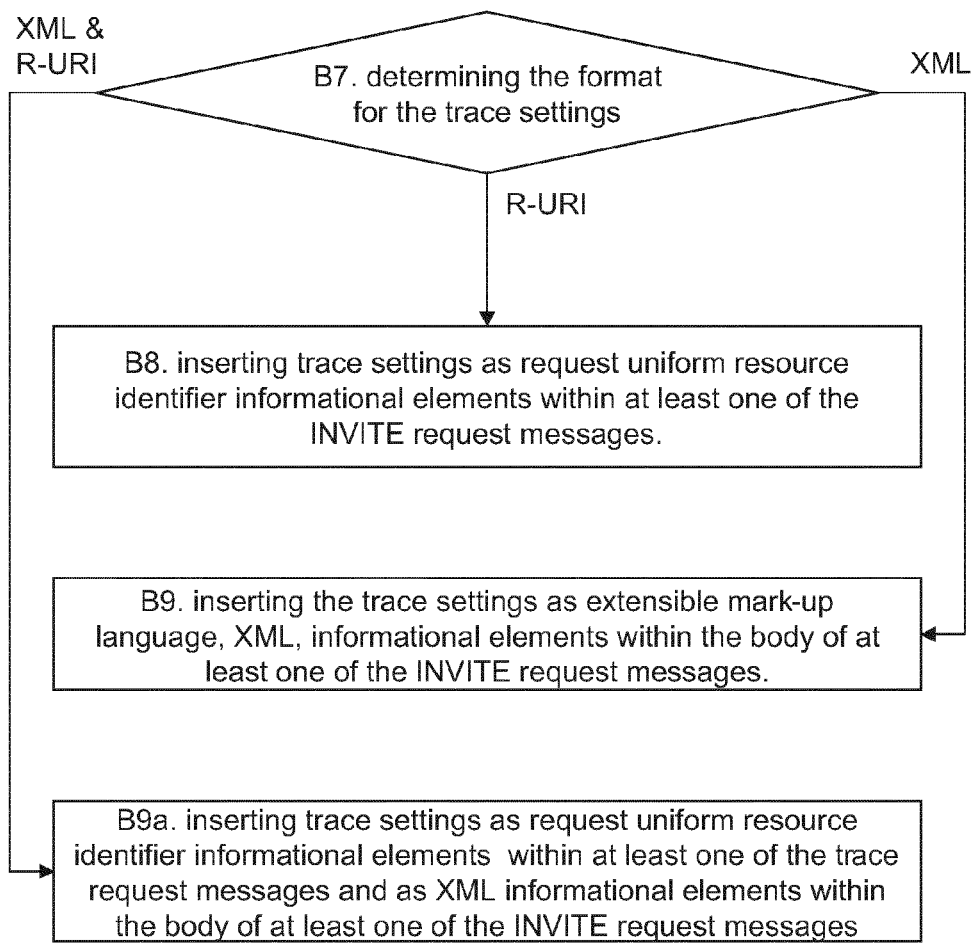
FIG. 7b illustrates a flow diagram illustrating an example process for an application server in determining trace setting formats in a trace session according to the invention.

FIG. 7b is a flow diagram illustrating an example process for inserting the trace settings by the AS into the SIP INVITE message for use in the example process of FIG. 7a. The process performs the following steps:

B7. Determining the format of the trace settings for insertion into the SIP INVITE message. This may depend on whether the one or more network elements and/or the first and second UEs may be configured for detecting or recognising that the insertion of the trace settings in the SIP INVITE message requires an appropriate response according to the trace session. If it is determined that the network elements and the UEs are configured to recognise initiation of the trace session from trace settings based on R-URI informational elements, then the process proceeds to B8. If it is determined that the network elements and the UEs are configured to recognise initiation of the trace session from trace settings based on XML informational elements, then the process proceeds to B9. However, if it is determined that some of the network elements and UEs are configured to recognise initiation of the trace session from trace settings based on XML informational elements, and some of the network elements and UEs are configured to recognise initiation of the trace session from trace settings based on R-URI informational elements, then the process proceeds to B9a.

B8. The trace settings are inserted within the body of the SIP INVITE request messages as XML informational elements.

B9. The trace settings are inserted within the SIP INVITE request messages as R-URI informational elements.

B9a. The trace settings are inserted within the body of the SIP INVITE request messages as XML informational elements, and within the SIP INVITE request messages as R-URI informational elements.

Figure 7C:
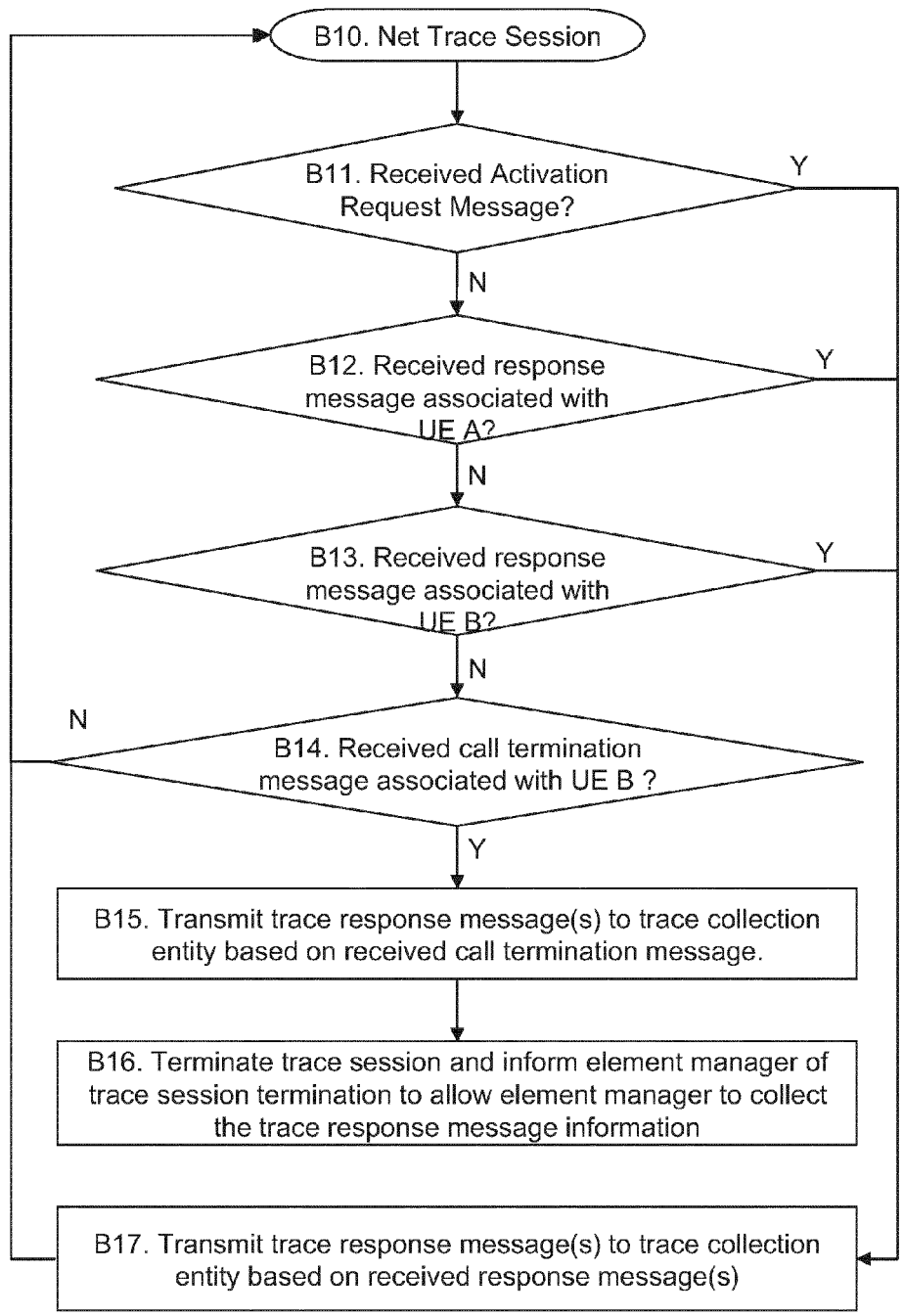
FIG. 7c illustrates a flow diagram illustrating an example process for operating an application server in a Net Trace session according to the invention.

FIG. 7c is a flow diagram illustrating an example portion of the process of FIG. 7a for operating the AS when the trace session is based on a Net Trace session. The trace session includes a Net Trace session such that the trace setting informational elements include informational elements describing the Net Trace session (e.g. Net Trace settings). When the trace session includes the Net Trace session, then the telecommunications network further includes a trace collection entity or trace collector. The example portion further includes the following steps:

B10. Receive a message in relation to a Net Trace session. Proceed to step B11.

The received message may be at least one of the messages from the group comprising the activation request message (e.g. Click_to_Dial(A, B, Net Trace settings)) from a trace session initiator (e.g. element manager, customer care centre, a user equipment such as the first UE), at least one response message associated with, or from, the first UE (e.g. 200 OK), at least one response message associated with, or from, the second UE (e.g. 486 Busy Here).

B11. If the received message is an activation request message from the trace session initiator, then proceed to step B17. Otherwise, proceed to step B12.

B12. If the received message is at least one response message associated with, or from, the first UE (e.g. UE-A), then proceed to step B17. Otherwise, proceed to B13.

B13. If the received message is at least one response message associated with, or from, the second UE (e.g. UE-B), then proceed to step B14. Otherwise, proceed to B10.

B14. If the at least one response message associated with, or from, the second UE is a call termination message (e.g. 486 Busy Here), then proceed to B15. Otherwise proceed to B10.

B15. Transmit one or more trace response message(s) (e.g. Net Trace(XML)) to the trace collection entity based on the received call termination message and/or other response messages due to be transmitted towards network elements or the first and second UEs in response to the received message. The trace response message(s) may include Net Trace result information based on the received message, the Net Trace result information may be provided in the form of XML informational elements. Proceed to B16.

As an example, the trace response message include network trace result data representative of traffic data related to the trace session, such as data based on the receipt of the received message and/or transmission of other messages to be transmitted towards network elements or the first and second UE in response to the received message. This data may be in the form of XML informational elements included in the body of the trace response message(s).

B16. Terminate the trace session and inform the trace session initiator of the trace session termination to allow the trace session initiator to collect the trace response message information from the trace collector entity. This can be achieved by transmitting a trace deactivation message (e.g. Click to dial call finished message) towards the trace session initiator. Receipt of the trace deactivation message may trigger the trace session initiator to retrieve the trace response message information (the information related to the trace response message(s) stored at the trace collector entity).

B17. Transmitting at least one trace response message (e.g. Net Trace(XML)) to the trace collection entity, the at least one trace response message comprises network trace result data or information based on at least one of the received messages from the group, the network trace result information in the form of XML informational elements.

In addition, one or more trace response message(s) may be transmitted to the trace collection entity based on other response messages (e.g. OK, INVITE A, INVITE B, ACK, BYE and any other response messages etc.) due to be transmitted towards the trace session initiator, one or more network element(s), or the first and second UEs in response to the received message.

Figure 7D:
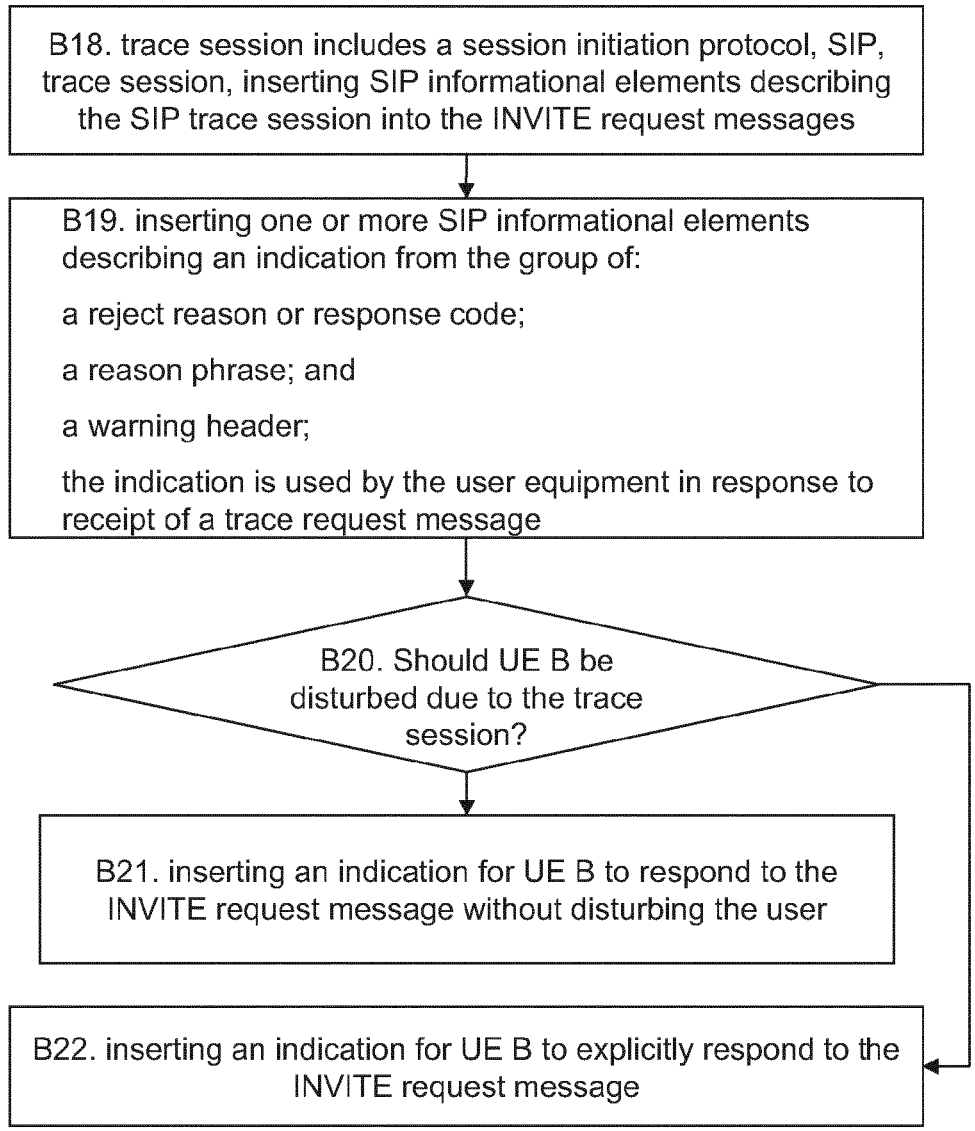
FIG. 7d illustrates a flow diagram illustrating an example process for operating an application server in a SIP Trace session according to the invention.

FIG. 7d is a flow diagram illustrating an example portion of the process of FIG. 7a for operating the AS when the trace session is based on a SIP Trace session. The trace session includes a SIP trace session such that the trace setting informational elements include informational elements describing the SIP trace session (e.g. SIP Trace settings). The example portion further includes the following steps:

B18. The trace session includes a SIP trace session, the trace setting informational elements including SIP informational elements describing the SIP trace session for insertion into the INVITE request messages towards the first and second UEs. The SIP informational elements may include an indication for at least one of the UEs to respond to the INVITE message without disturbing the user of the UE. Proceed to B19.

B19. Inserting one or more SIP informational elements into the INVITE message for each of the first or second UE, where the indication includes at least one of a predefined SIP message from the group of: a reject reason or response code; a reason phrase; and a warning header, or any other message for use in the trace session. The indication is used by each of the first or second UE in response to receipt of the corresponding INVITE request message.

B20. Determining whether the user of the second UE should be disturbed due to the trace session. If the user is not to be disturbed, then proceed to step B21. Otherwise, proceed to step B22.

B21. Inserting an indication into the SIP Trace settings for the second UE to respond to the INVITE request message associated with the second UE without disturbing the user. For example, the second UE may reply to the INVITE request message automatically with a response code defined in the SIP trace settings of the INVITE response message.

B22. Inserting an indication into the SIP Trace settings for the second UE to response to the INVITE request message associated with the second UE with the second UE notifying the user of the receipt of the INVITE request message. That is the indication includes data that is interpreted by the second UE to explicitly response to the INVITE request message (e.g. allowing the second UE to ring, or display a message and/or a sound notifying the user of the trace session).

Although the above process as described with respect to FIG. 7a assumed that the AS controlled the trace session, it is to be appreciated that the trace session may be initiated by a trace session initiator that does not require the AS to control the trace session. In this case, the AS may simply operate as a network element would when receiving a trace activation message. For example, the trace initiator may be the first UE and the trace activation message may be a SIP INVITE request message associated with the second UE. The first UE includes the capability of inserting into the SIP INVITE message the required trace settings for initiating the trace session.

In such an example, the process for operating the AS during a trace session associated with the first and second UEs in a telecommunications network comprising the IMS network, the first UE and the second UE may differ slightly from the process outlined in relation to FIG. 7a. The AS may include the steps of receiving, from the trace session initiator, an activation request message (e.g. the SIP INVITE request message) for activating the trace session, the SIP INVITE request message including trace settings comprising informational elements describing the trace session and identity information associated with the second UE. The AS determines from the trace settings one or more network elements for use in forwarding the received SIP INVITE request message towards the second UE. The AS transmits the SIP INVITE request message including the trace settings towards the second UE. The AS may then receive, in response to the SIP INVITE request message, a SIP response message associated with, or from, the second UE, for use in terminating the trace session.

The AS may detect the trace settings as extensible mark-up language, XML, informational elements within the body of the SIP INVITE request message. Alternatively, the AS may detect the trace settings as R-URI informational elements within the SIP INVITE request message.

When the trace session initiator is the first UE and the trace activation message is a SIP INVITE message associated with the second UE, and the SIP INVITE request message includes trace settings associated with the trace session, then the step of terminating the trace session includes transmitting the SIP response message associated with, or from, the second UE towards the first UE for use in the first UE terminating the trace session.

Figure 8A:
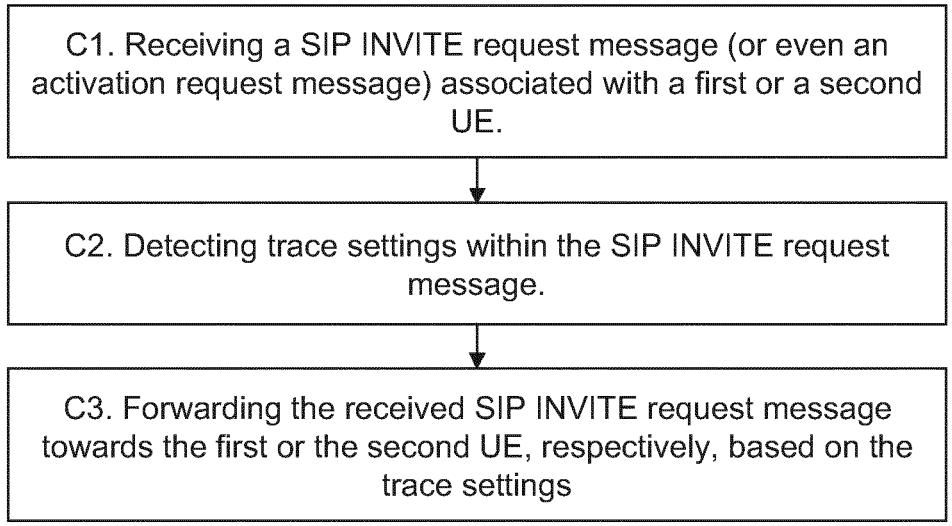
FIG. 8a illustrates a flow diagram illustrating an example process for operating a network element during a trace session according to the invention.

FIG. 8a is a flow diagram illustrating another example process for operating a network element according to the invention when a trace session associated with a first UE (UE A) and a second UE (UE B) is performed in a telecommunications network. It is to be appreciated that in this example, the telecommunications network comprises an IMS network, the network element (and one or more other network elements), the first UE and the second UE. The trace session is associated with the first and second UEs. Examples of traces sessions include, but are not limited to, a Net Trace session, a SIP Trace session, and/or a combined Net Trace and SIP Trace session. The process performs the following steps:

C1. Receiving a SIP INVITE request message (or even an activation request message) associated with the first or the second UE. The SIP INVITE request message includes trace settings describing the trace session.

C2. Detecting the trace settings within the SIP INVITE request message. This may include detecting the trace settings as extensible mark-up language, XML, informational elements within the body of the SIP INVITE request message. In addition, or alternatively, this may include detecting the trace settings as R-URI informational elements within at least one of the INVITE request messages.

C3. Forwarding the received SIP INVITE request message towards the first or the second UE, respectively, based on the trace settings.

The process may include further steps as described in relation to FIGS. 2a to 5b.

When the trace session includes a Net Trace session, the trace setting informational elements include informational elements describing the Net Trace session and the telecommunications network further includes a trace collection entity. The process may further include the step of transmitting at least one trace response message to the trace collection entity in response to receiving at least one of the messages from the group comprising: an activation request message from a trace session initiator, the activation request message associated with the first or the second UE; a SIP INVITE request message associated with the first or the second UE; at least one response message associated with, or from, the first UE or the second UE; and at least one call termination message associated with the second UE. The at least one trace response message comprises Net Trace result information based on at least one of the received messages from the group, the Net Trace result information in the form of XML informational elements.

Figure 8B:
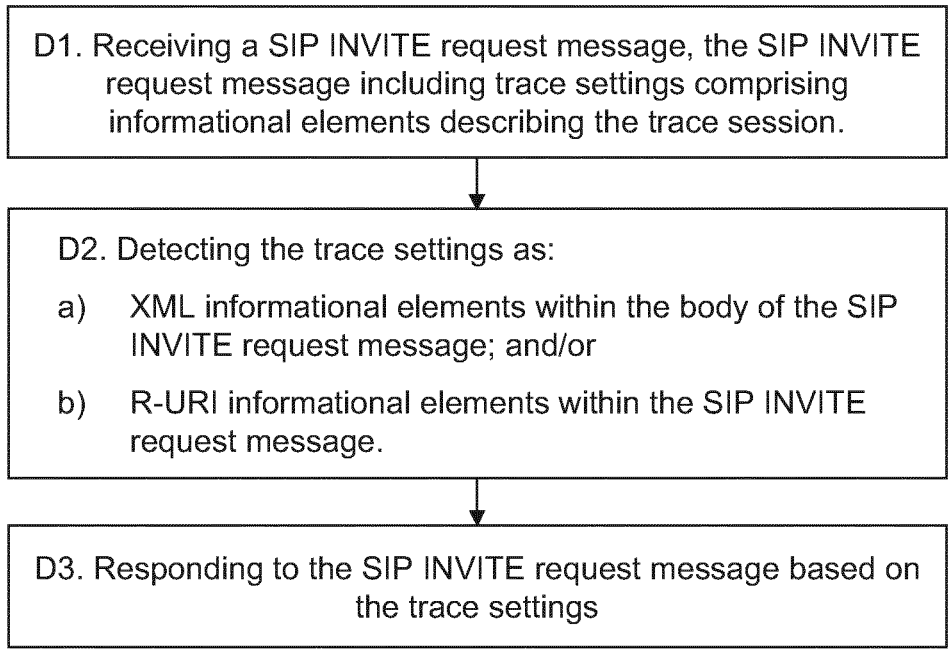
FIG. 8b illustrates a flow diagram illustrating an example process for operating a UE during a trace session according to the invention.

FIG. 8b is a flow diagram illustrating another example process for operating a UE according to the invention during a trace session associated with the UE is performed in a telecommunications network. The process performs the following steps:

D1. Receiving a SIP INVITE request message, the SIP INVITE request message including trace settings comprising informational elements describing the trace session.

D2. Detecting the trace settings comprising the informational elements. The UE may be configured to detect the trace settings as XML informational elements within the body of the SIP INVITE request message. Alternatively or additionally, the UE may be configured to detect the trace settings as R-URI informational elements within the SIP INVITE request message.

D3. Responding to the SIP INVITE request message based on the trace settings.

The process may include further steps as described in relation to FIGS. 2a to 5b. The IMS network may include an AS configured for controlling the trace session such that step D3 may further include transmitting a SIP response message based on the trace settings to the AS for use by the AS in terminating the trace session.

When the trace session includes a Net Trace session, the trace setting informational elements include informational elements describing the Net Trace session and the telecommunications network further includes a trace collection entity, then step D3 may further include transmitting a trace response message to the trace collection entity in response to receiving the SIP INVITE request message, wherein the trace response message comprises Net Trace result information based on receiving the SIP INVITE request message and the trace settings therein, the Net Trace result information in the form of XML informational elements.

When the trace session includes a SIP trace session, the trace setting informational elements including SIP informational elements describing the SIP trace session, wherein the SIP informational elements include an indication requiring the UE to respond to the trace request message. This may include the UE responding to the trace request message without disturbing the user.

Figure 8C:
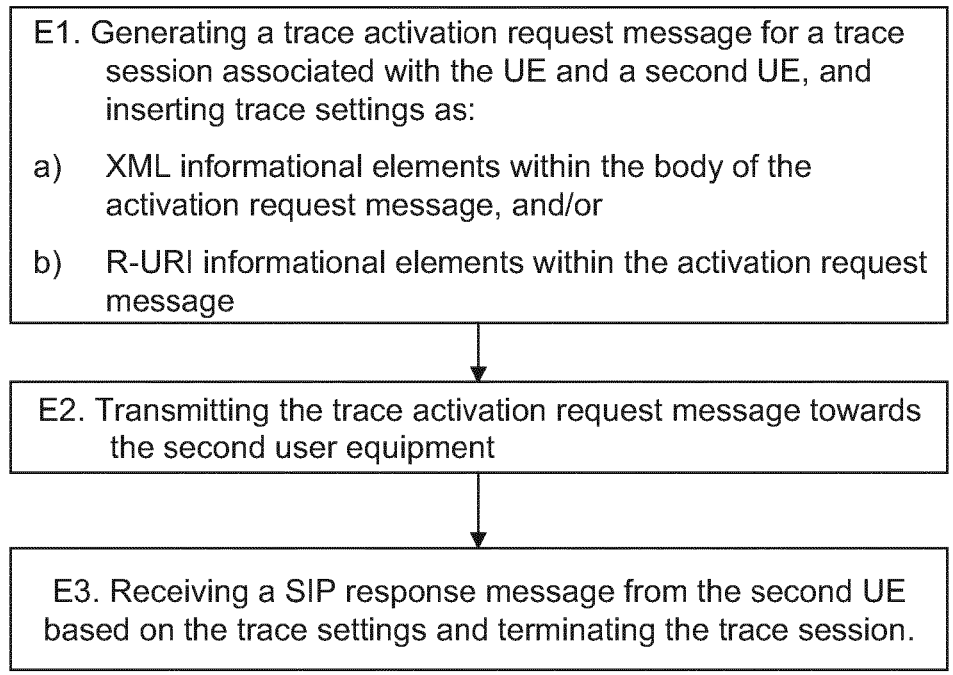
FIG. 8c illustrates a flow diagram illustrating an example process for operating a UE for initiating a trace session according to the invention.

FIG. 8c is a flow diagram illustrating another example process for operating a UE according to the invention during a trace session when the UE is a trace session initiator. The process according to the invention may include the following steps:

E1. Generating a trace activation request message including trace settings associated with the user equipment and the second UE. The activation request message may be a SIP INVITE request message associated with the second UE. Generating the activation request message include inserting the trace settings as XML informational elements within the body of the activation request message or the SIP INVITE request message; and/or R-URI informational elements within the activation request message or the SIP INVITE request message.

E2. Transmitting the trace activation request message towards the second UE.

E3. Receiving a SIP response message from the second UE based on the trace settings, and terminating the trace session.

The process may include further steps as described in relation to FIGS. 5a and 5b.

Figure 9:
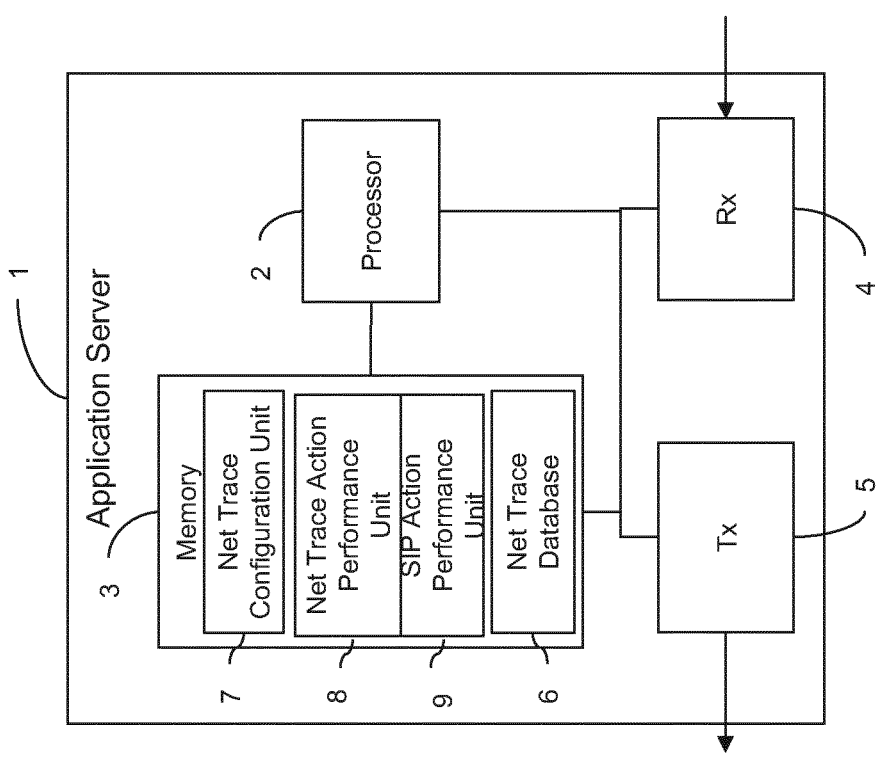
FIG. 9 illustrates schematically an example of an Application Server suitable for implementing the methods described herein.

FIG. 9 illustrates schematically an example of an AS 1 suitable for implementing the methods or processes described herein. The AS may be an AS of an IMS network that is configured for use (e.g. as a controller) in a trace session in a telecommunications network comprising the IMS network, a first UE, and a second UE, where the trace session is associated with the first and second UEs. The AS 1 includes a processor 2, a memory unit 3, receiver 4, and a transmitter 6, the processor being connected to the receiver 4, to the transmitter 6, and to the memory unit 3. The memory unit 3 stores the various programs/executable files that are implemented by the processor 2, i.e. used to configure the processor 2, and also provides a storage unit for any required data e.g. temporary network trace result information, trace settings such as Net Trace settings and SIP Trace settings etc. The memory unit 3 may include a Net Trace Configuration Unit and/or a SIP Trace Configuration Unit, a Net Trace Action Performance Unit, a SIP Action Performance Unit, and Net Trace Database.

In operation, the receiver 4 is configured for receiving, from a trace session initiator, an activation request message for activating the trace session, the activation request message including trace settings comprising informational elements describing the trace session. The processor 2 is configured for determining from the trace settings one or more network elements for use in forwarding SIP INVITE request messages towards the first and second UEs. The transmitter 6 is configured for transmitting INVITE request messages including the trace settings towards the first and second UEs, wherein the INVITE request messages are used for a call set-up between the first and second UEs. The receiver 4 and processor 2 are further configured for receiving, in response to the INVITE request messages, response messages associated with, or from, the first and second UEs. The transmitter 6 is further configured for transmitting a deactivation response message, to the trace session initiator, for deactivating the trace session based on receiving a SIP response message from the second UE.

For inserting the trace settings into the SIP INVITE request message, the processor 2 is further configured to insert the trace settings as XML informational elements within the body of the INVITE request message. This may be dependent on the determination of the one or more network elements and the capabilities of the first and second UEs. Alternatively or in addition to inserting XML informational elements, the processor 2 may be further configured to insert the trace settings as R-URI informational elements or parameters within the INVITE request message.

When the trace session includes a Net Trace session, the trace setting informational elements include informational elements describing the Net Trace session and the telecommunications network further includes a trace collection entity. The processor 2 and transmitter 6 are further configured to generate and transmit at least one trace response message to the trace collection entity in response to receiving at least one of the messages from the group comprising: the activation request message from the trace session initiator; at least one response message associated with, or from, the first UE; at least one response message associated with, or from, the second UE; where the at least one trace response message comprises network trace result information based on at least one of the received messages from the group, the network trace result information in the form of XML informational elements. When the trace session includes a SIP Trace session, the trace setting informational elements further include SIP informational elements describing the SIP trace session, where the SIP informational elements include an indication for at least one of the UEs to respond to the trace request message without disturbing the user of the at least one UE.

Figure 10:
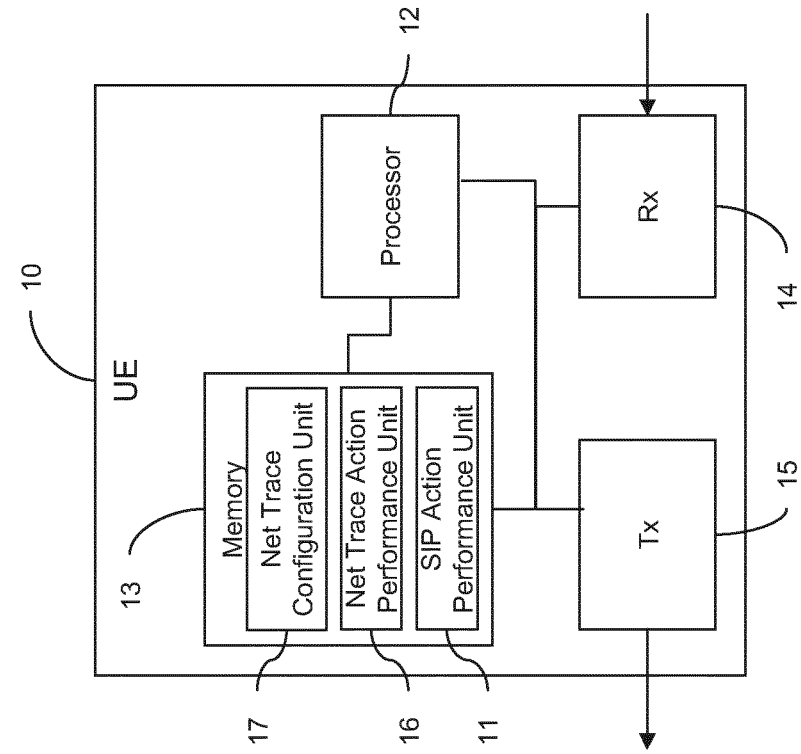
FIG. 10 illustrates schematically an example of a UE suitable for implementing the methods described herein.

FIG. 10 illustrates schematically an example of a UE 10 suitable for implementing the methods and/or described herein. The UE 10 may be used within a telecommunications network, the telecommunications network comprising an IMS network including an AS 1 (or as described herein), where the AS 1 controls a trace session associated with the UE 10. The UE 10 includes a processor 12, a memory unit 13, a receiver 14 and a transmitter 15, the processor 12 being connected to the receiver 14, to the transmitter 15, and to the memory unit 13. The memory unit 13 stores the various programs/executable files that are implemented by the processor 12 (e.g. for configuring the processor 12, the receiver 14, and transmitter 15) and also provides a storage unit for any required data e.g. temporary network trace result information, trace settings such as Net Trace settings and SIP Trace settings etc. The memory unit 13 may include a Net Trace Configuration Unit and/or a SIP Trace Configuration Unit, a Net Trace Action Performance Unit, a SIP Action Performance Unit.

In operation, the receiver 14 is configured for receiving an INVITE request message sent towards the UE from the AS, the INVITE request message including trace settings comprising informational elements describing the trace session. The processor 12 is configured for detecting the trace settings comprising the informational elements. The transmitter 16 is configured for sending a response message towards the AS 1 and/or a trace collection entity (not shown) in response to the INVITE request message based on the trace settings. The processor may be further configured to detect the trace settings based from at least any one of XML informational elements within the body of the INVITE request message, and/or R-URI informational elements within the INVITE request message.

When the trace session includes a Net Trace session, the trace setting informational elements include informational elements describing the Net Trace session and the telecommunications network further includes the trace collection entity. The processor 12 and transmitter 15 are further configured to generate and transmit at least one of the response messages in the form of a trace response message to the trace collection entity in response to receiving the INVITE request message. The trace response message comprises network trace result data or information, wherein the processor 12 is further configured to insert the network trace result information into the body of the trace response message in the form of XML informational elements.

When the trace session includes a SIP Trace session, the trace setting informational elements further include SIP informational elements describing the SIP trace session, in which the processor 12 is further configured to detect the SIP informational elements including an indication for the UE 10 to respond to the INVITE request message without disturbing the user. In addition, the processor 12 of UE 10 may be further configured to generate a trace activation request message including trace settings associated with the UE 10, another UE and/or a second UE. The transmitter 16 may be further configured to transmit the trace activation request message to the AS 1 to initiate the trace session.

UE 10 may further be configured as a trace session initiator, where the processor 12 is further configured to generate a trace activation request message including trace settings associated with the UE 10 and a second UE. The trace settings are inserted into the activation request message as XML informational elements within the body of the activation request message and/or as R-URI informational elements within the activation request message. The activation request message may be a SIP INVITE request message. The transmitter 15 is further configured to transmit the trace activation request message towards the second UE. The receiver 14 and/or processor 12 are further configured to receive a SIP response message from the second UE based on the trace settings and terminating the trace session.

Figure 11:
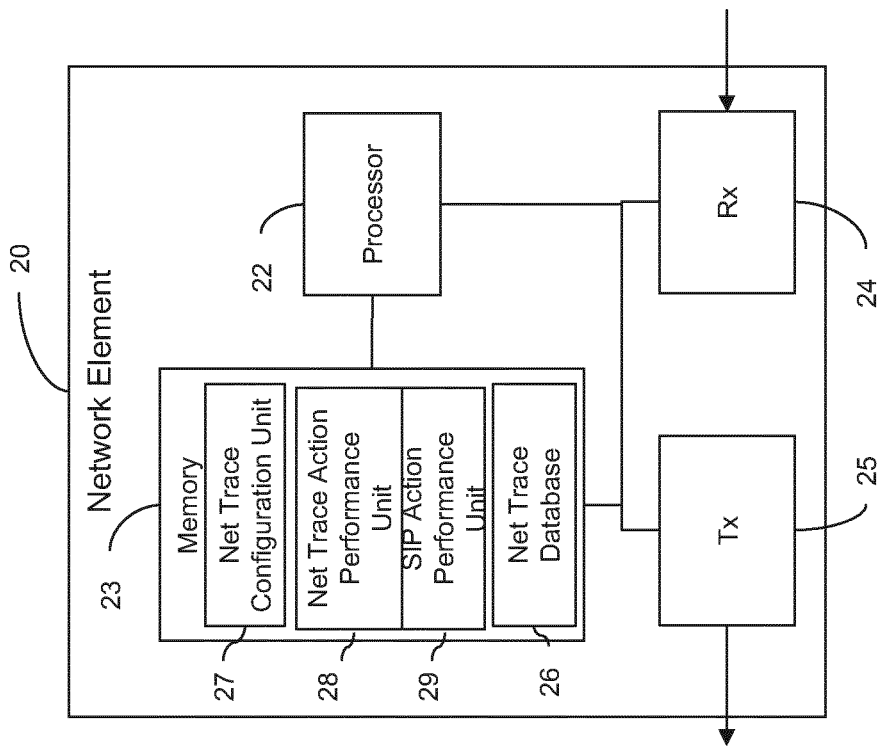
FIG. 11 illustrates schematically an example of a network element suitable for implementing the methods described herein.

FIG. 11 illustrates schematically an example of a network element 20 suitable for implementing the methods and processes described herein. The network element 20 is part of a telecommunications network, in which the telecommunications network may include an IMS network, a first and second UE, where a trace session associated with the first and second UEs may be triggered by an AS 1 within the telecommunications network. The network element 20 includes a processor 22, a memory unit 23, a receiver 24, and a transmitter 25. The processor 22 being connected to the receiver 24, to the transmitter 25, and to the memory unit 23. The memory unit 23 stores the various programs/executable files that are implemented by the processor 22, i.e. used to configure the processor 22, and also provides a storage unit for any required data e.g. temporary network trace result information, trace settings such as Net Trace settings and SIP Trace settings etc. The memory unit 23 may include a Net Trace Configuration Unit 27 and/or a SIP Trace Configuration Unit, a Net Trace Action Performance Unit 28, a SIP Action Performance Unit 29, and Net Trace Database 26.

In operation, the receiver 24 is configured for receiving a SIP INVITE request message associated with the first or the second UE, the INVITE request message including trace settings describing the trace session. The processor 22 is configured for detecting the trace settings within the INVITE request message. The transmitter 25 is configured for forwarding the received INVITE request message towards the first or the second UE, respectively. The processor 22 and transmitter 25 are further configured for transmitting, in response to receiving the INVITE request message and detecting the trace settings, response messages associated with the trace session to the sender of the INVITE request message and/or a trace collection entity. The processor 22 may be further configured to detect the trace settings from at least any one of XML informational elements within the body of the INVITE request message, and/or, R-URI informational elements within the INVITE request message.

When the trace session includes a Net Trace session, the trace setting informational elements include informational elements describing the Net Trace session and the telecommunications network further includes the trace collection entity. The processor 22 and transmitter 26 are further configured to generate and transmit at least one of the response messages in the form of a trace response message to the trace collection entity in response to receiving the INVITE request message. The trace response message comprises network trace result data or information, wherein the processor 22 is further configured to insert the network trace result information into the body of the trace response message in the form of XML informational elements.

It is to be appreciated that the network element 20 may comprise or represent any network node, device, function, or entity in a telecommunications network, examples of which may include the elements that make up core network(s), access network(s) such as packet or circuit switched network(s), IP based networks, 2G, 3G, 4G and next generation networks, Evolved Packet Core networks, IMS core network(s), IMS service network(s), and service and external networks and the like. Other examples of network elements those network elements illustrated in FIG. 1 including, but not limited to, HSSs, ASs, I-CSCFs, P-CSCFs, S-CSCFs, SGWs, GGSNs, SSGN, SBGs, MRFs, MGs/MGWs, MSs, MGCFs, BGCFs, eNBs, RBSs, RNCs, Node Bs, SGWs, or MMEs and other core network, access network devices, entities, nodes, elements or the like.

The methods and/or processes as described herein may be implemented as one or more computer program(s) comprising software or instruction code, which when executed on one or more processor(s) (e.g. in an AS, a network element, a UE or any other suitable network apparatus or device), performs the steps of one or more of the methods or processes as described. The computer program(s) may be stored on one or more computer readable medium(s).

It will be appreciated by the person of skill in the art that various modifications may be made to the above described examples and/or embodiments without departing from the scope of the present invention.

The invention claimed is:

1. A method for operating an application server of an Internet Protocol Multimedia Subsystem (IMS) network during a trace session in a telecommunications network comprising the IMS network, a first user equipment (UE), and a second UE, wherein the trace session is associated with the first and second UEs, wherein the method is performed by the application server comprising a processing circuitry configured for:
receiving, from a trace session initiator, an activation request message for activating the trace session, the activation request message including trace settings comprising informational elements describing the trace session and identity information associated with the second UE;
determining from the trace settings one or more network elements for use in forwarding a Session Initiation Protocol (SIP) INVITE request message towards the second UE;
transmitting the SIP INVITE request message including the trace settings towards the second UE; and
receiving, in response to the SIP INVITE request message, a SIP response message associated with, or from, the second UE, for use in terminating the trace session.

2. The method according to claim 1, wherein the processing circuitry is further configured for inserting the trace settings as extensible mark-up language (XML) informational elements within a body of the SIP INVITE request message.

3. The method according to claim 1, wherein the processing circuitry is further configured for inserting the trace settings as request Uniform Resource Identifier informational elements within the SIP INVITE request message.

4. The method according to claim 1, wherein, the processing circuitry is further configured for terminating the trace session, and when the processing circuitry of the application server is configured to control the trace session, terminating the trace session includes:
transmitting a call termination message towards the first UE on receiving the SIP response message associated with, or from, the second UE; and
transmitting a trace termination message, to the trace session initiator, for terminating the trace session on receiving an acknowledgement response from the first UE.

5. The method according to claim 1, the telecommunications network further comprising a first network element in a communication path between the application server (AS) and the first UE and a second network element in the communication path between the AS and the second UE, and the activation request message includes identities of the first and second UEs for use by the AS in transmitting SIP INVITE request messages towards the first and second UEs, wherein transmitting the SIP INVITE request message further comprises:
transmitting a first SIP INVITE request message associated with the first UE towards the first network element, the first SIP INVITE message including the trace settings; and
transmitting a second SIP INVITE request message associated with the second UE towards the second network element, the second SIP INVITE message including the trace settings,
wherein the first and second SIP INVITE request messages are for use in setting up a trace call between the first and second UEs.

6. The method according to claim 5, wherein the trace session includes a SIP trace session, the trace setting informational elements including SIP informational elements describing the SIP trace session, the SIP informational elements including an indication for at least one of the first and second UEs to respond to the activation request message without disturbing a user.

7. The method according to claim 6, wherein the indication includes at least one of a predefined SIP message from a group of:
a reject reason or a response code;
a reason phrase; and
a warning header,
wherein the indication is used by at least one of the first and second UEs in response to receipt of the SIP INVITE request message associated with the at least one of the first and second UEs.

8. The method according to claim 1, wherein the trace session initiator comprises an element manager, wherein the first UE is associated with the element manager and the second UE is associated with a user, and wherein the activation request message includes the trace settings and identity information associated with the first and second UEs.

9. The method according to claim 1, wherein the trace session initiator is the first UE and the activation request message is a SIP INVITE message associated with the second UE and including the trace settings associated with the trace session, wherein the processing circuitry is further configured for terminating the trace session, and wherein terminating the trace session includes transmitting the SIP response message associated with, or from, the second UE towards the first UE for terminating the trace session.

10. The method according to claim 1, wherein the trace session includes a Net Trace session, the trace setting informational elements include informational elements describing the Net Trace session and the telecommunications network further includes a trace collection entity, and wherein the processing circuitry is further configured for:
transmitting at least one trace response message to the trace collection entity in response to receiving at least one of the messages from a group comprising:
the activation request message from the trace session initiator;
at least one response message associated with, or from, the first UE; and
at least one response message associated with, or from, the second UE,
wherein the at least one trace response message comprises Net Trace result information based on at least one of the received messages from the group, and further wherein the Net Trace result information is in the form of extensible mark-up language (XML) informational elements.

11. A method for operating a network element of a telecommunications network during a trace session, the telecommunications network comprising an Internet Protocol Multimedia Subsystem (IMS) network and a first user equipment (UE) and a second UE, wherein the trace session is associated with the first and second UEs, wherein the method is performed by the network element comprising a processing circuitry configured for:
receiving a Session Initiation Protocol (SIP) INVITE request message associated with the first or the second UE, the SIP INVITE request message including trace settings describing the trace session;
detecting the trace settings within the SIP INVITE request message; and
forwarding the received SIP INVITE request message towards the first or the second UE, respectively, based on the trace settings.

12. The method according to claim 11, wherein the processing circuitry is further configured for detecting the trace settings as extensible mark-up language (XML) informational elements within a body of the SIP INVITE request message.

13. The method according to claim 11, wherein the processing circuitry is further configured for detecting the trace settings as request Uniform Resource Identifier informational elements within the SIP INVITE request message.

14. The method according to claim 11, wherein the trace session includes a Net Trace session, the trace setting informational elements include informational elements describing the Net Trace session, and the telecommunications network further includes a trace collection entity, wherein the processing circuitry is further configured for:
transmitting at least one trace response message to the trace collection entity in response to receiving at least one of the messages from a group comprising:
the SIP INVITE request message associated with the first or the second UE;
at least one response message associated with, or from, the first UE or the second UE; and
at least one call termination message associated with the second UE,
wherein the at least one trace response message comprises Net Trace result information based on at least one of the received messages from the group, the Net Trace result information being in the form of extensible mark-up language (XML) informational elements.

15. A method for operating a first user equipment (UE) during a trace session in a telecommunications network comprising an IP Multimedia Subsystem (IMS) network, wherein the method is performed by the UE comprising a processing circuitry configured for:
receiving a Session Initiation Protocol (SIP) INVITE request message, the SIP INVITE request message including trace settings comprising informational elements describing the trace session;
detecting the trace settings comprising the informational elements; and
responding to the SIP INVITE request message based on the trace settings,
wherein, the IMS network further comprises an application server (AS) configured for controlling the trace session, and wherein responding to the SIP INVITE request message further includes transmitting a SIP response message based on the trace settings to the AS for use by the AS in terminating the trace session.

16. The method according to claim 15, wherein the processing circuitry is further configured for detecting the trace settings as at least one of:
extensible mark-up language (XML) informational elements within a body of the SIP INVITE request message; and
request Uniform Resource Identifier informational elements within the SIP INVITE request message.

17. The method according to claim 15, wherein the trace session includes a Net Trace session, the trace setting informational elements include informational elements describing the Net Trace session and the telecommunications network further includes a trace collection entity, and wherein responding to the SIP INVITE request message further includes transmitting a trace response message to the trace collection entity in response to receiving the INVITE request message, wherein the trace response message comprises Net Trace result information based on receiving the SIP INVITE request message and the trace settings therein, and further wherein the Net Trace result information is in the form of extensible mark-up language (XML) informational elements.

18. The method according to claim 15, wherein the trace session includes a SIP trace session, the trace setting informational elements including SIP informational elements describing the SIP trace session, wherein the SIP informational elements include an indication requiring the UE to respond to the trace request message without disturbing a user.

19. The method according to claim 15, wherein the processing circuitry is further configured for:
generating a trace activation request message including trace settings associated with the first UE and a second UE;
transmitting the trace activation request message towards the second UE; and
receiving a SIP response message from the second UE based on the trace settings and terminating the trace session.

20. The method according to claim 19, wherein the trace activation request message is a SIP INVITE request message associated with the second UE, wherein the processing circuitry is further configured for inserting the trace settings as at least one of:
extensible mark-up language (XML) informational elements within a body of the SIP INVITE request message; and
request Uniform Resource Identifier informational elements within the SIP INVITE request message.

21. An application server of an Internet Protocol Multimedia Subsystem (IMS) network for use in a trace session performed in a telecommunications network comprising the IMS network, a first user equipment (UE), and a second UE, wherein the trace session is associated with the first and second UEs, the application server comprising:
a receiver, a transmitter, a memory unit, and a processor, the processor being connected to the receiver, to the transmitter, and to the memory unit, wherein:
the receiver is configured for receiving, from a trace session initiator, an activation request message for activating the trace session, the activation request message including trace settings comprising informational elements describing the trace session and identity information associated with the second UE;

the processor is configured for determining from the trace settings, one or more network elements for use in forwarding a Session Initiation Protocol (SIP) INVITE request message towards the second UE;

the transmitter is configured for transmitting the SIP INVITE request message including the trace settings towards the second UE; and the receiver and the processor are further configured for receiving, in response to the SIP INVITE request message, a SIP response message associated with, or from, the second UE for use in terminating the trace session.

22. The application server according to claim 21, wherein the processor is further configured to insert at least one of:

the trace settings as extensible mark-up language (XML) informational elements within a body of the SIP INVITE request message; and the trace settings as request uniform resource identifier informational elements within the SIP INVITE request message.

23. The application server according to claim 21, further comprising:

the processor configuring the application server to control the trace session, the transmitter and the processor are further configured for terminating the trace session by:

transmitting a call termination message towards the first UE on receiving the SIP response message from the second UE; and transmitting a trace termination message, to the trace session initiator, for terminating the trace session on receiving an acknowledgement response from the first UE.

24. The application server according to claim 21, wherein, when the trace session includes a Net Trace session, the trace setting informational elements include informational elements describing the Net Trace session and the telecommunications network further includes a trace collection entity, the processor and the transmitter are further configured to:

generate and transmit at least one trace response message to the trace collection entity in response to receiving at least one of the messages from a group comprising:

the activation request message from the trace session initiator;

at least one response message associated with, or from, the first UE; and at least one response message associated with, or from, the second UE, wherein the at least one trace response message comprises Net Trace result information based on at least one of the received messages from the group, and further wherein the Net Trace result information is in the form of extensible mark-up language (XML) informational elements.

25. The application server according to claim 21, wherein when the trace session includes a SIP trace session, the trace setting informational elements further include SIP informational elements describing the SIP trace session, and wherein the SIP informational elements include an indication for at least one user equipment to respond to the trace request message without disturbing a user of the at least one user equipment.

26. A network element of a telecommunications network, the telecommunications network comprising an Internet Protocol Multimedia Subsystem (IMS) network and a first user equipment (UE) and a second (UE), wherein a trace session is associated with the first and second UEs, the network element comprising:

a receiver, a transmitter, a memory unit, and a processor, the processor being connected to the receiver, to the transmitter, and to the memory unit, wherein:

the receiver is configured for receiving a Session Initiation Protocol (SIP) INVITE request message associated with the first or the second UE, the SIP INVITE request message including trace settings describing the trace session;

the processor is configured for detecting the trace settings within the SIP INVITE request message; and the transmitter is configured for forwarding the received SIP INVITE request message towards the first or the second UE based on the trace settings.

27. The network element according to claim 26, wherein the processor is further configured to detect the trace settings from at least one of:

extensible mark-up language (XML) informational elements within a body of the INVITE request message; and request uniform resource identifier informational elements within the INVITE request message.

28. A first user equipment (UE) for use in a trace session performed in a telecommunications network, the telecommunications network comprising an IP Multimedia Subsystem (IMS) network, the trace session associated with the first UE, the first UE comprising:

a receiver, a transmitter, a memory unit, and a processor, the processor being connected to the receiver, to the transmitter, and to the memory unit, wherein:

the receiver is configured for receiving a Session Initiation Protocol (SIP) INVITE request message, the SIP INVITE request message including trace settings comprising informational elements describing the trace session;

the processor is configured for detecting the trace settings comprising the informational elements; and the processor and the transmitter are configured for responding to the SIP INVITE request message based on the trace settings, wherein the processor and the transmitter are further configured to respond to the SIP INVITE request message by transmitting a SIP response message based on the trace settings to the IMS network for use in terminating the trace session.

29. The first UE according to claim 28, wherein the processor is further configured to detect the trace settings based from at least one of:

extensible mark-up language (XML) informational elements within a body of the trace request message; and request uniform resource identifier informational elements within the trace request message.

30. The first UE according to claim 28, wherein the trace session includes a Net Trace session, the trace setting informational elements include informational elements describing the Net Trace session and the telecommunications network further includes a trace collection entity, the processor and the transmitter further configured to generate and transmit at least one trace response message to the trace collection entity in response to receiving the SIP INVITE request message, wherein the trace response message comprises Net Trace result information, and wherein the processor is further configured to insert the Net Trace result information into a body of the trace response message in the form of extensible mark-up language (XML) informational elements.

31. The first UE according to claim 28, wherein the trace session includes a SIP trace session, and the trace setting informational elements further include SIP informational elements describing the SIP trace session, wherein the processor is further configured to detect the SIP informational elements including an indication for the first UE to respond to the trace request message without disturbing a user.

32. The first UE according to claim 28, wherein:
the processor is further configured to generate a trace activation request message including trace settings associated with the first UE and a second UE, wherein the trace settings are inserted into the activation request message as at least one of:
  extensible mark-up language (XML) informational elements within a body of the SIP INVITE request message; and
  request Uniform Resource Identifier informational elements within the SIP INVITE request message;
the transmitter is further configured to transmit the trace activation request message towards the second UE; and
the receiver is further configured to receive a SIP response message from the second UE based on the trace settings and terminating the trace session.

* * * * *